May 26, 1936.   W. D. ARCHEA   2,042,245
MILLING MACHINE TRANSMISSION AND ELECTRIC CONTROL THEREFOR
Filed Jan. 2, 1935   9 Sheets-Sheet 4
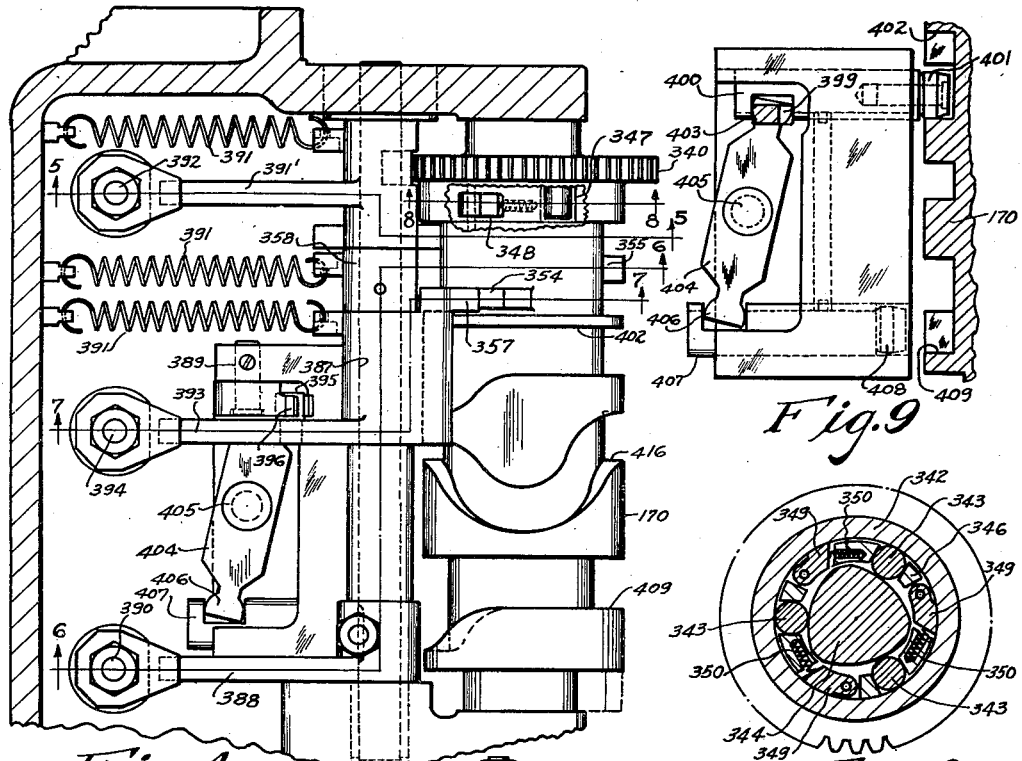
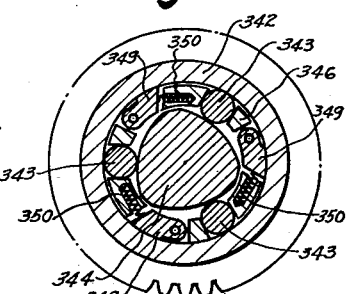
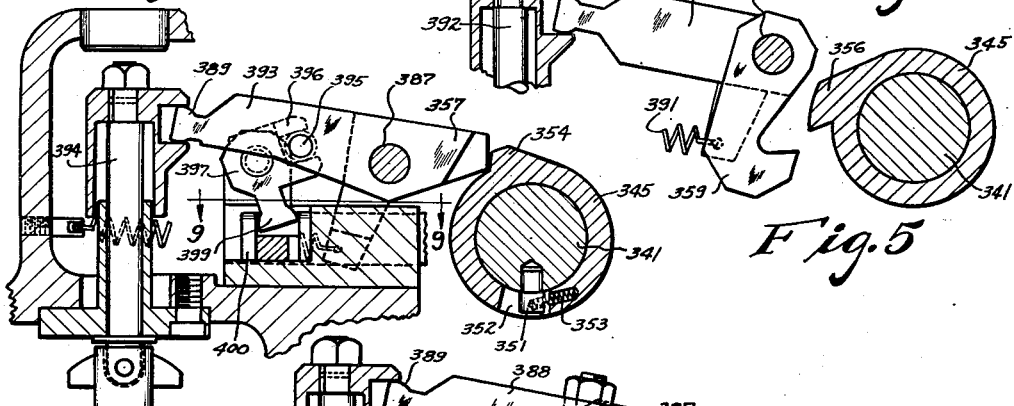
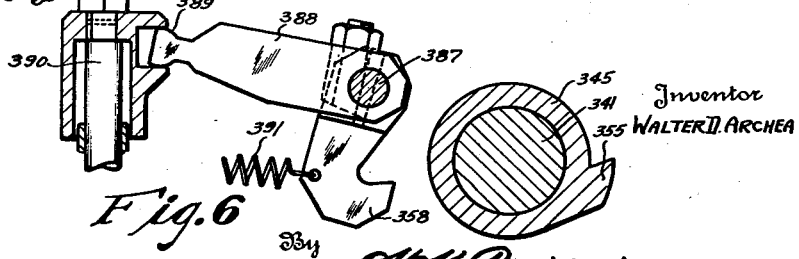

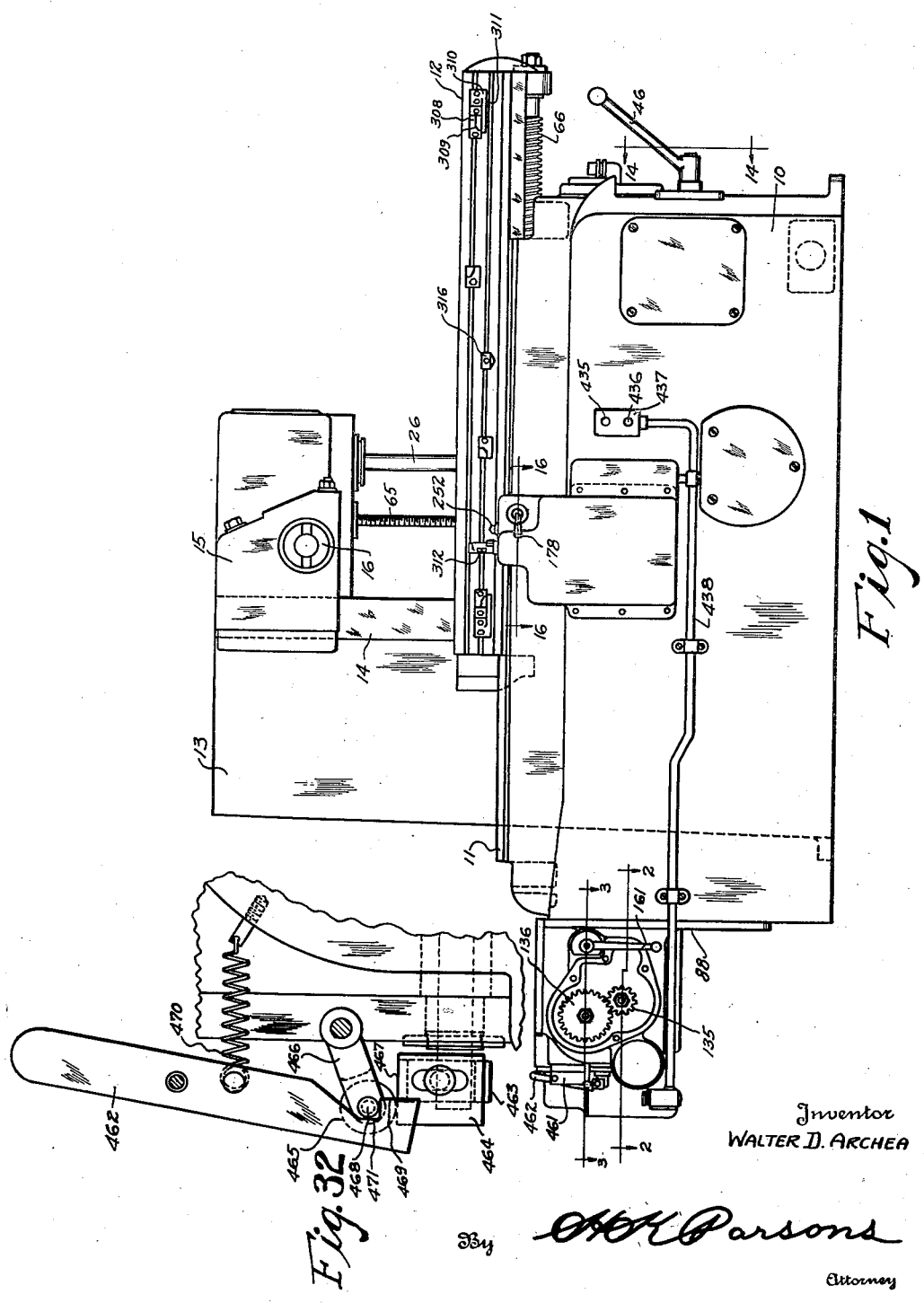

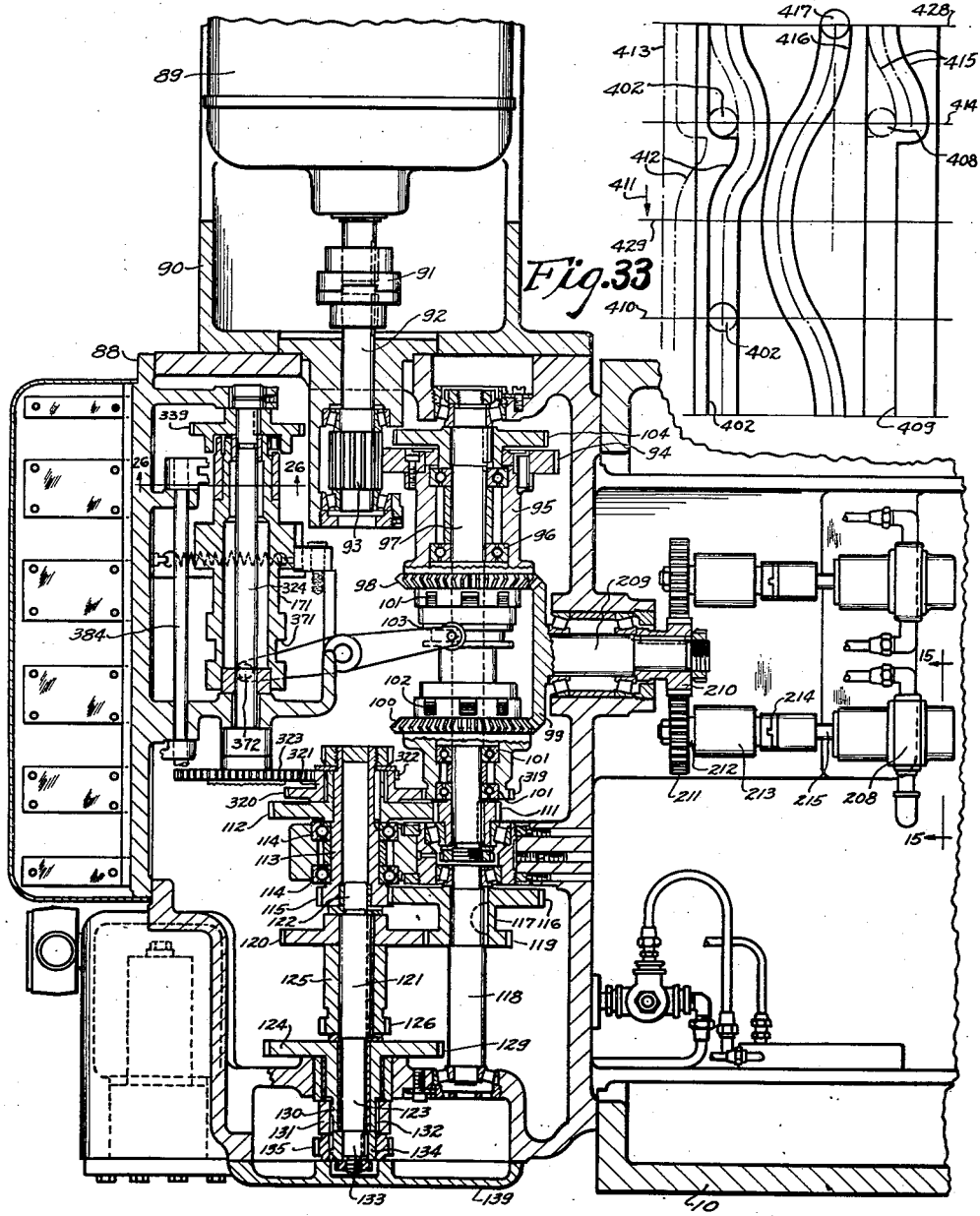

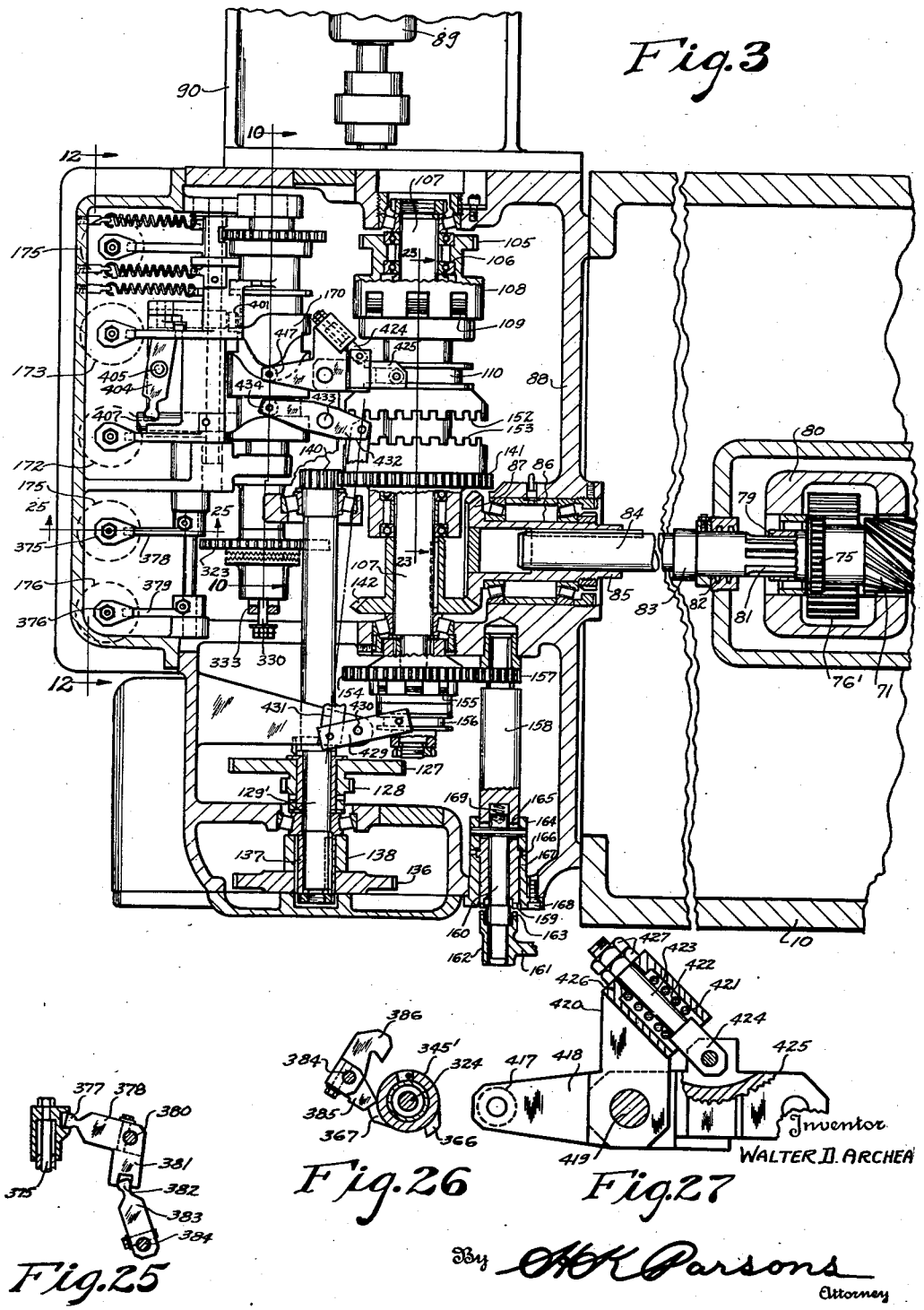

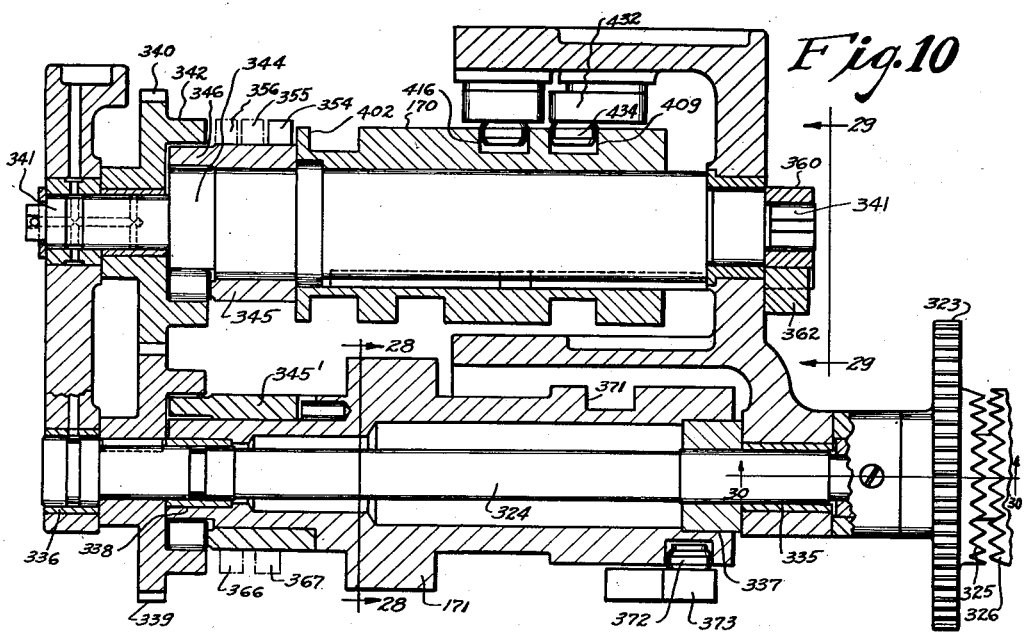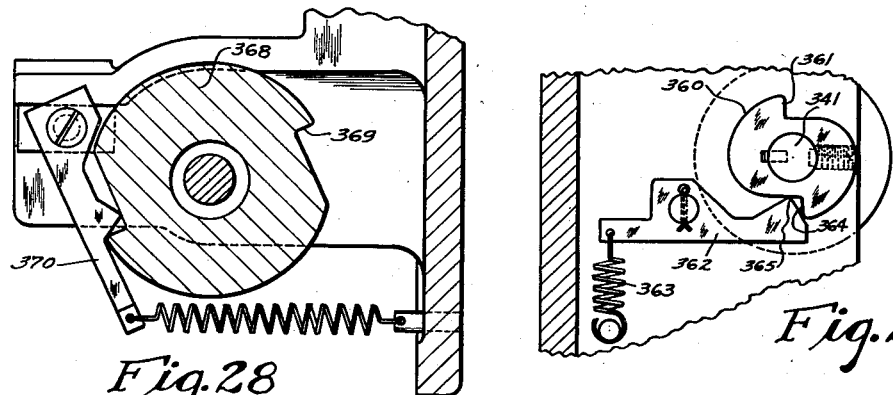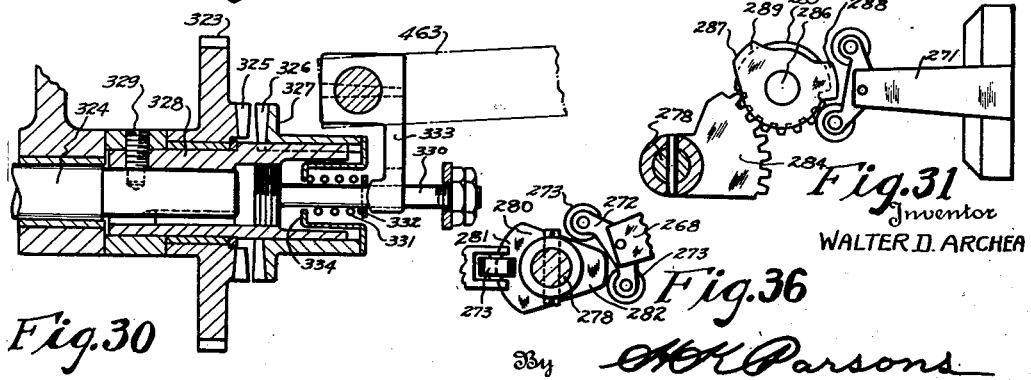

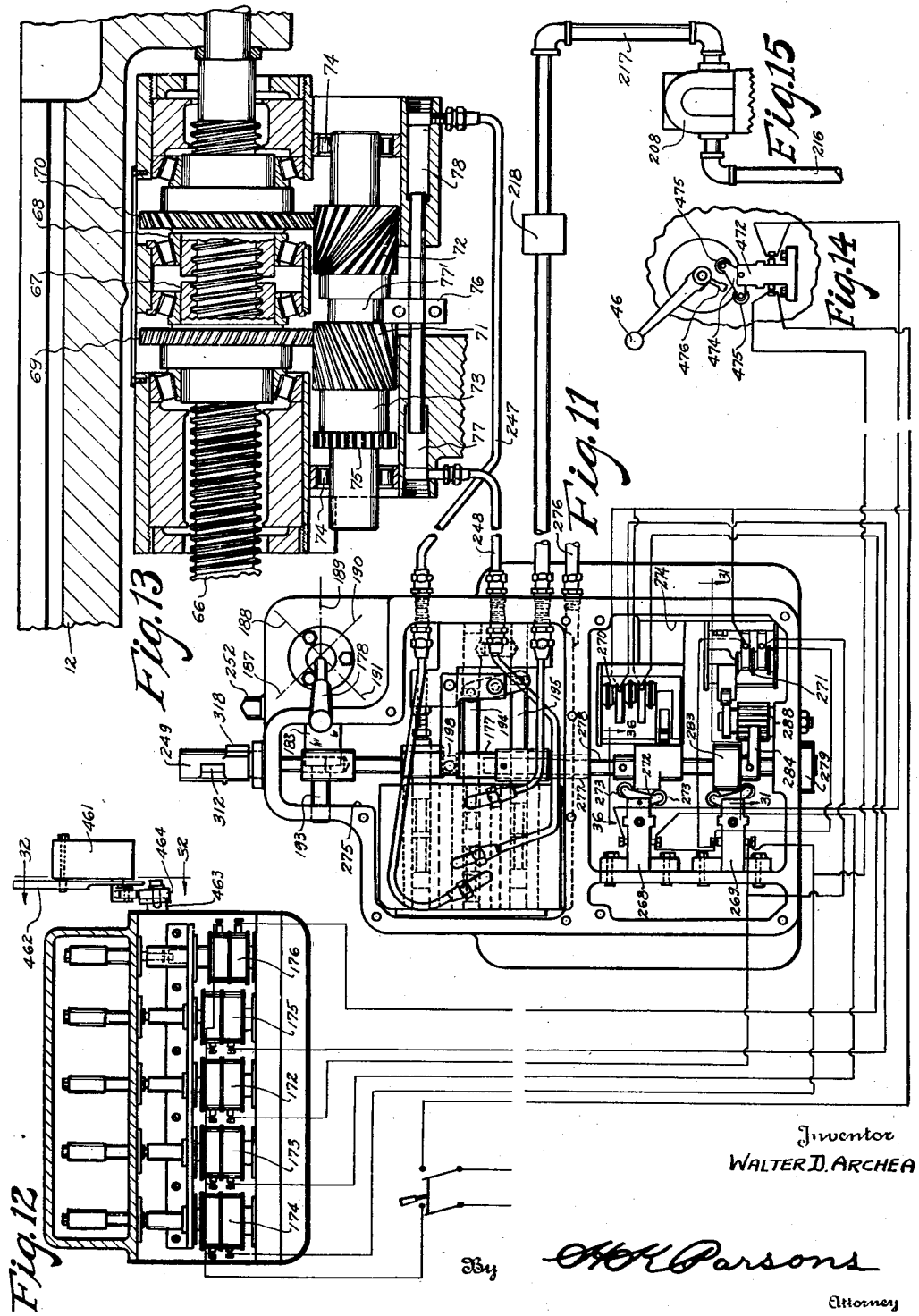

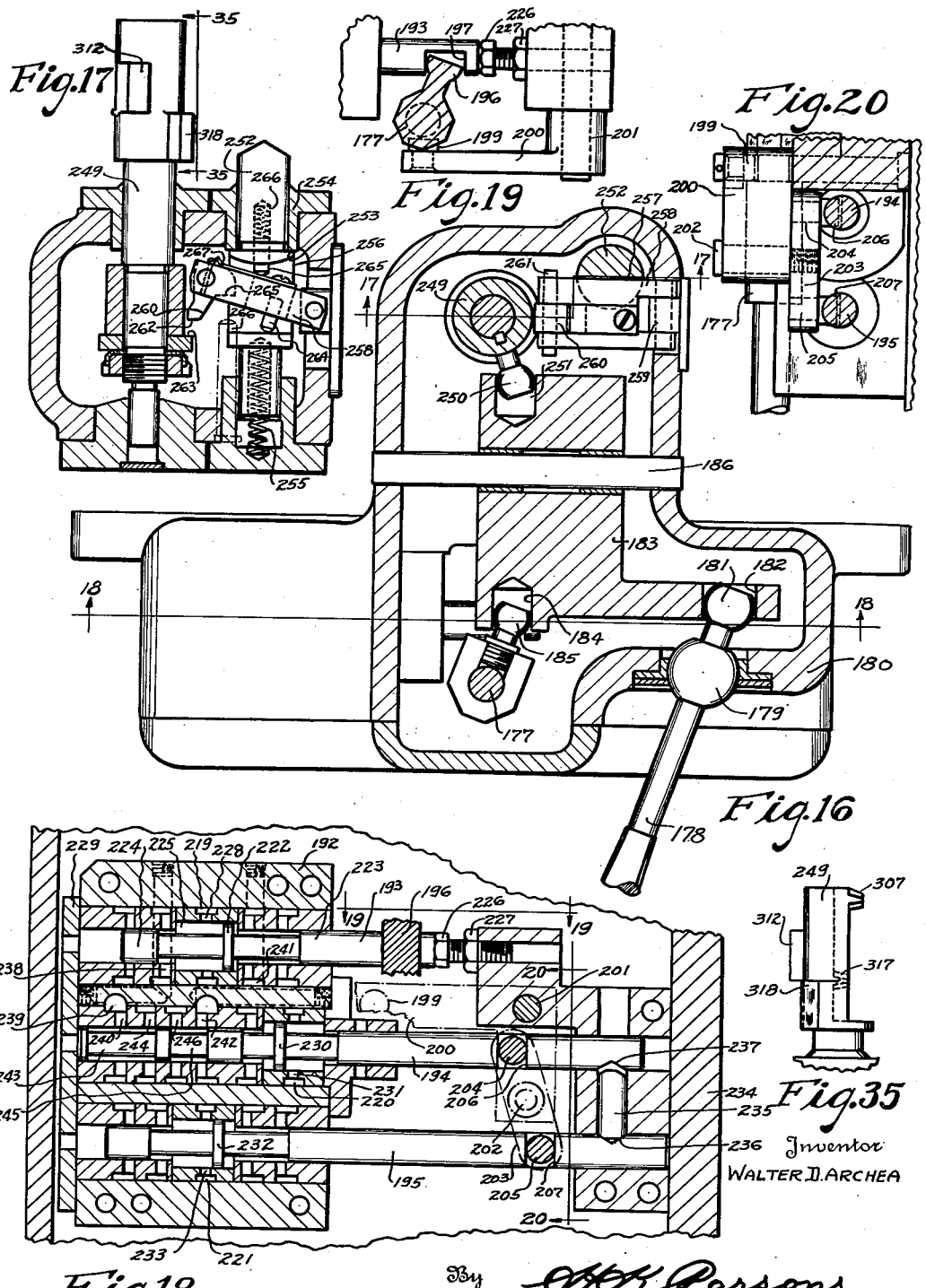

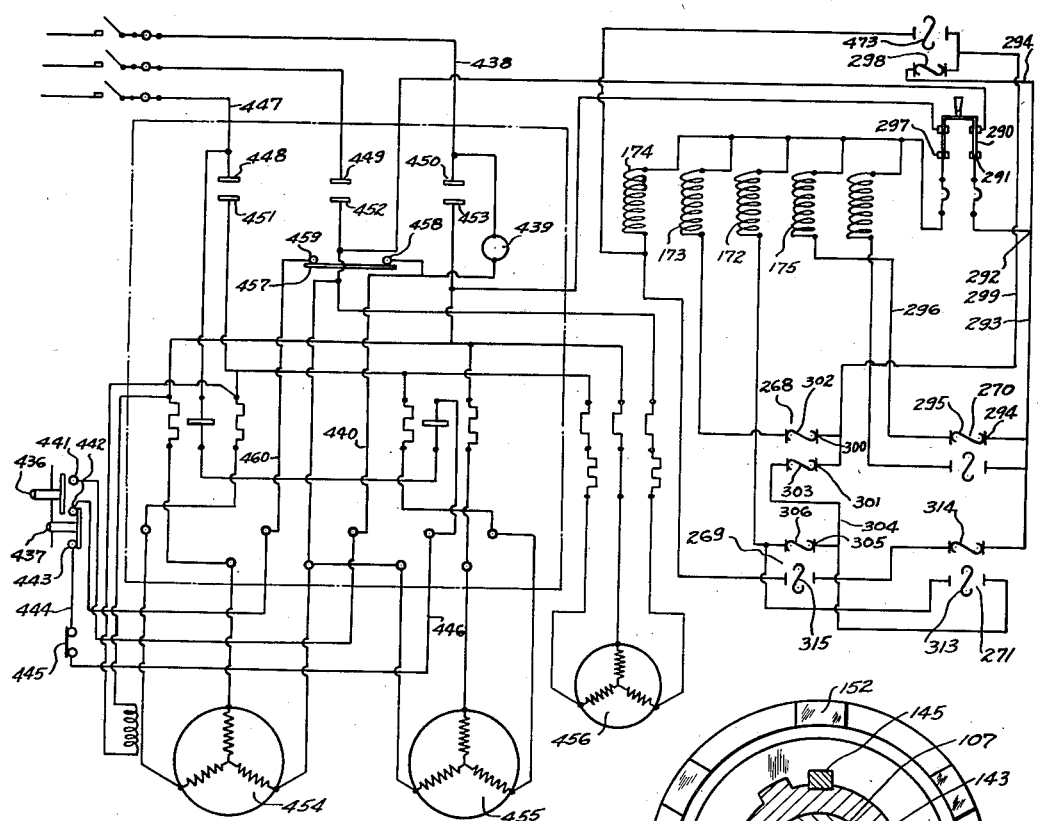
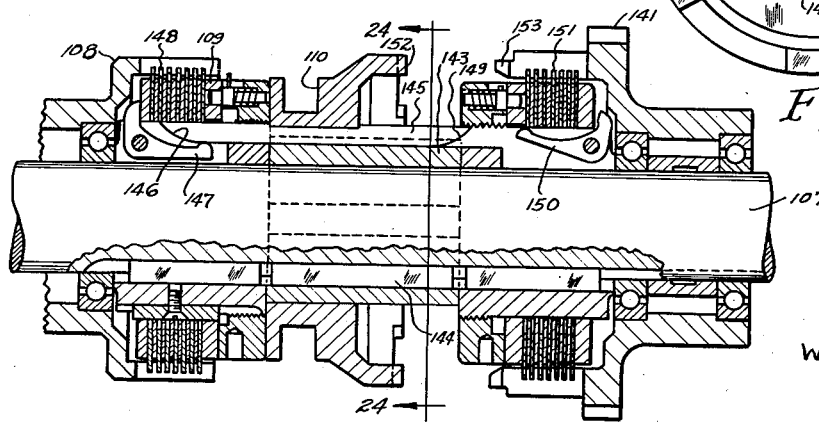
Fig.21
Fig.24
Fig.23
Inventor
WALTER D. ARCHEA

Inventor
WALTER D. ARCHEA

Patented May 26, 1936

2,042,245

UNITED STATES PATENT OFFICE 2,042,245

MILLING MACHINE TRANSMISSION AND
ELECTRIC CONTROL THEREFOR

Walter D. Archea, Cincinnati, Ohio, assignor to
The Cincinnati Milling Machine Co., Cincinnati, Ohio, a corporation of Ohio Application January 2, 1935, Serial No. 124

28 Claims. (Cl. 90—21)

This invention relates to machine tools and more particularly to an improved transmission and control mechanism for a milling machine.

One of the objects of this invention is to provide a simple compact transmission unit for imparting selectively a plurality of relatively slow or feeding rates between the cutter and work or a relatively fast or quick traverse rate.

Another object of this invention is to provide an improved control mechanism which will be immediately responsive to trip operation by the table for shifting the various control clutches, thereby enhancing the trip accuracy of the machine.

A further object of this invention is to provide an improved power operable mechanism for shifting the various control elements of the machine, thereby eliminating dependence on the moving part for obtaining power for this purpose.

A still further object of this invention is to provide a self-contained transmission unit which may be constructed and assembled as a unit independent of the machine and automatically coupled with the driving part for the table upon assembly with the machine.

An additional object of this invention is to provide improved interlocking mechanism between the tool driving mechanism and the feeding mechanism of a machine tool; improve the operating characteristics of the machine whereby starting or changing of rates during operation may be effected in a smooth and efficient manner; and generally improve the operating and control characteristics of a machine of the class described.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is a section through the detachable transmission box as viewed on the line 2—2 of Figure 1.

Figure 3 is a section similar to Figure 2 but taken on the line 3—3 of Figure 1.

Figure 4 is an enlargement of a portion of Figure 3 showing the details of the solenoid operated latch control mechanism for the cam shaft.

Figure 5 is a detail view taken on the line 5—5 of Figure 4.

Figure 6 is a detail view taken on the line 6—6 of Figure 4.

Figure 7 is a detail view taken on the line 7—7 of Figure 4.

Figure 8 is a section on line 8—8 of Figure 4 showing the details of the overrunning clutch mechanism.

Figure 9 is a detail sectional view taken on the line 9—9 of Figure 7.

Figure 10 is a sectional view through the control cams as viewed on line 10—10 of Figure 3.

Figure 11 is an elevational view of the control bracket with the front cover removed.

Figure 12 is a section on the line 12—12 of Figure 3 showing the position of the various control solenoids.

Figure 13 is an expanded detail view of the back lash eliminating mechanism for the table lead screw.

Figure 14 is a detail view of the starting control lever and interlock switch as viewed on the line 14—14 of Figure 1.

Figure 15 is a detail view of the hydraulic pressure supply pump and connections thereto as viewed on the line 15—15 of Figure 2.

Figure 16 is a section through the control bracket as viewed on the line 16—16 of Figure 1.

Figure 17 is a section through the control bracket as viewed on the line 17—17 of Figure 16 showing the trip and stop plungers and connections thereto.

Figure 18 is a section on the line 18—18 of Figure 16 showing the details of the hydraulic control valve.

Figure 19 is a detail view on the line 19—19 of Figure 18.

Figure 20 is a detail view on the line 20—20 of Figure 18.

Figure 21 is a diagram of the electrical control circuit.

Figure 23 is an enlarged detail view through the feed rapid traverse control clutch as viewed on the line 23—23 of Figure 3.

Figure 24 is a detail section on the line 24—24 of Figure 23.

Figure 25 is a detail section on the line 25—25 of Figure 3.

Figure 26 is a detail section on the line 26—26 of Figure 2.

Figure 27 is an enlarged detail view of the feed rapid traverse clutch shifter fork.

Figure 28 is a detail section on the line 28—28 of Figure 10.

Figure 29 is a detail section on the line 29—29 of Figure 10.

Figure 30 is a section on the line 30—30 of

Figure 10 showing the details of the interlock control clutch.

Figure 31 is a detail section on the line 31—31 of Figure 11.

Figure 32 is an enlarged detailed section on the line 32—32 of Figure 12.

Figure 34:
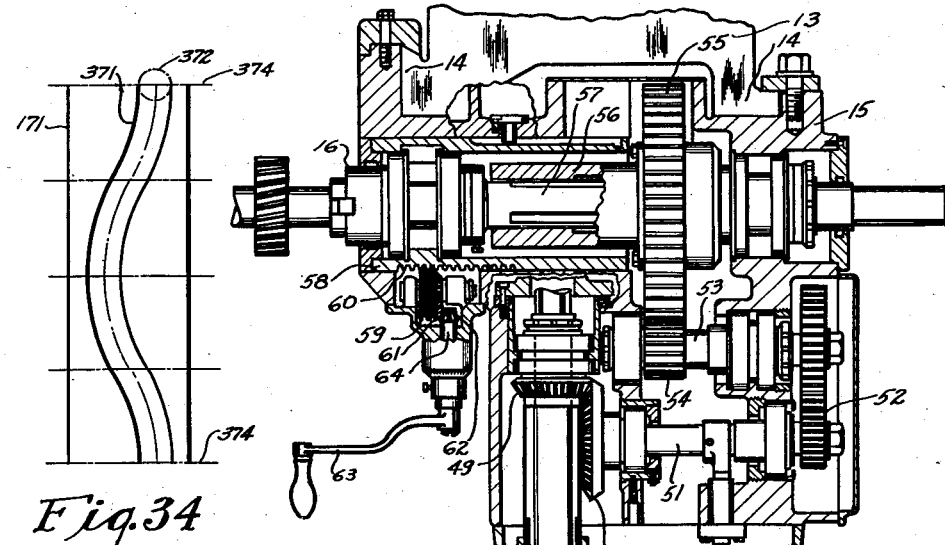

Figures 33 and 34 are expanded views of the cam tracks in the control cams.

Figure 35 is a detail view of the upper end of the main control plunger.

Figure 36 is a section on the line 36—36 of Figure 11.

In Figure 1 the reference numeral 10 indicates the bed of the machine having guide ways 11 formed on the top thereof for receiving and guiding a work table 12. Uprising from the back of the bed is a column 13 having vertical guide ways 14 formed upon one face thereof for receiving a spindle carrier 15 in which is journaled the tool spindle 16.

Figure 22:
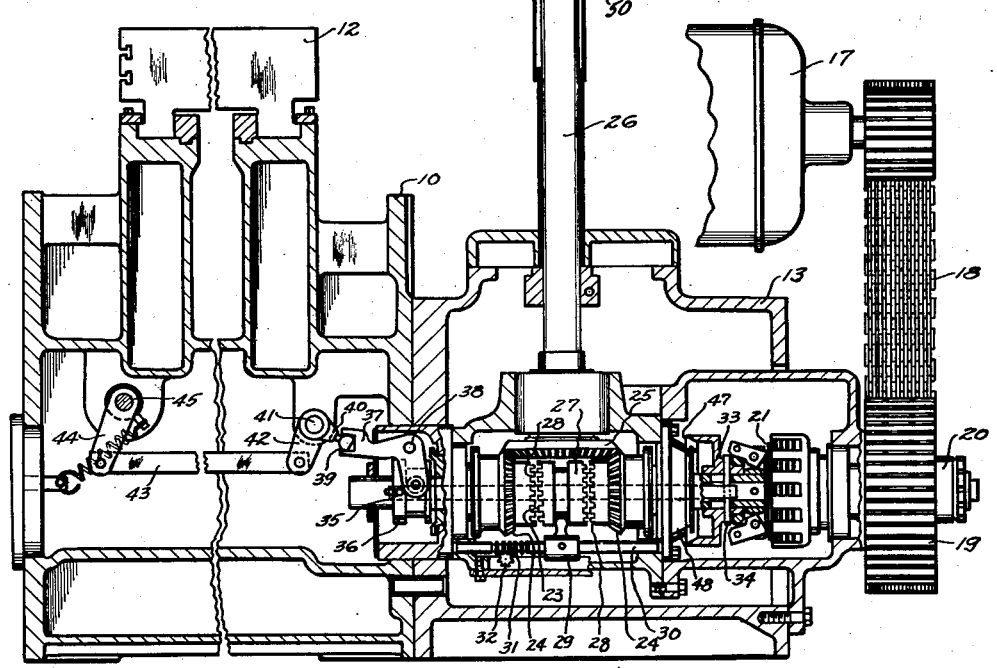
Figure 22 is a sectional view showing the details of the tool spindle transmission.

The transmission for actuating the tool spindle is shown more particularly in Figure 22 and includes a prime mover 17 which is connected by suitable motion transmitting means, such as the drive chain 18, to the sprocket wheel 19 secured to the end of the drive shaft 20. This drive shaft extends horizontally through a portion of the base of the column 13 and is connectible by suitable means, such as the friction clutch 21, to a driving sleeve 23 upon which is mounted for free rotation a pair of opposed bevel gears 24. These gears intermesh with a common bevel gear 25 keyed to the end of a vertical splined shaft 26. A clutch member 27 is splined on the sleeve 23 and has clutch teeth 28 formed on opposite ends thereof for selective interengagement with similarly formed clutch teeth carried on the opposing faces of the bevel gears 24 for effecting reverse rotation of the shaft 26. A shifter fork 29 is fixed to a shifter rod 30 for movement of clutch 28, the shifter rod having rack teeth 31 formed thereon interengaging with a pinion 32 fixed to the end of a manually operable shaft not shown.

The friction clutch 21 has a shiftable member 33 which is connected by a pin 34 to a longitudinally movable rod 35 which at the left end has a spool 36 secured thereto by which the clutch may be engaged and disengaged by longitudinal movement of the rod. A shifter fork 37 is pivotally mounted at 38 for interengagement with the spool and has a ball receiving socket 39 formed therein for receiving the ball ended lever 40 which is pivotally mounted at 41 in a fixed portion of the machine bed.

The lever 40 has a crank arm 42 integral therewith which is connected by a link 43 and crank 44 to the shaft 45, which shaft extends through the end of the bed for receiving an operating handle 46 which is shown in Figure 1. When the handle is moved upward in that figure the clutch is engaged and when moved downward the clutch is disengaged and a friction cone surface 47 integral with the member 33 is interengaged with a fixed cone surface 48 which serves as a brake for immediately stopping the tool spindle.

The shaft 26 which extends into the spindle carrier is splined into a bevel gear 49 which intermeshes with a bevel gear 50 fixed to the end of a shaft 51. This shaft is connected through change gears, indicated generally by the reference numeral 52, to the pinion shaft 53 which carries a pinion 54 intermeshing with the large spur gear 55. The spur gear is fixed for rotating a sleeve 56 which has a splined connection with the tool spindle 57. The forward end of the tool spindle is anti-frictionally journaled in a quill 58 and is fixed for axial movement therewith, this movement being effected through conventional means comprising a spiral gear 59 which intermeshes with rack teeth 60 formed on the periphery of the quill, the spiral gear having a spur gear 61 integral therewith which is interengaged by a manually rotatable bevel pinion 62. This rotation may be effected by the manually rotatable handle 63 carried on the end of a shaft 64 which supports the pinion 62.

The tool spindle may thus be driven in opposite directions and at variable speeds and may be vertically adjusted on the guide ways 14 by means of an elevating screw 65, such as shown in Figure 1, whereby the vertical position of the spindle with respect to the table may be determined and the spindle may also be axially adjusted in a horizontal plane transversely of the table. An interlock mechanism to be described later also serves to automatically control the rotation of the spindle in accordance with movement of the table. The table is reciprocated by means of a lead screw 66 which is fixed against rotation in opposite ends of the table and which passes through a pair of rotatable nuts 67 and 68, which are shown in Figure 13, and which are anti-frictionally journaled in a fixed part of the bed of the machine. The nut 67 carries a spiral gear 69 on its periphery, the teeth of which are at a different angle to the teeth of a spiral gear 70 carried by the rotatable nut 68. The spiral gear 69 meshes with a spiral gear 71 and the gear 70 meshes with the spiral gear 72, the gears 71 and 72 being fixed to a shaft 73 for joint rotation, the shaft, however, being axially movable in bearing 74.

The spiral gears are rotated by a pinion 75 which is fixed to the shaft 73 and intermeshes with a wide spur gear 76' as more particularly shown in Figure 3. The two pairs of intermeshing spiral gears of different tooth angle constitute a backlash eliminating mechanism which operates in the following manner:

When the shaft 73 is moved toward the right as by means of a fork 76 engaging an annular groove 77 in the sleeve the spiral gears 69 and 70 will be rotated unequal amounts, whereby one will engage one side of the thread of the lead screw and the other will engage the other side of the thread to take out all backlash. The particular side of the lead screw thread engaged by the nut 68, for instance, will depend upon the direction of rotation of the nut so as to prevent locking up of the device and therefore two hydraulic cylinders 77 and 78 have been provided, one of the cylinders receiving pressure to effect urge in one direction when the rotation is clockwise and the other cylinder receiving pressure when the rotation of the nuts is counterclockwise. Since the specific details of this backlash eliminating mechanism forms no part of the present invention it is believed sufficient to state that pressure is admitted to the cylinders 77 and 78 selectively and depending upon the direction of table movement to eliminate backlash during feeding movements of the table and that the pressure is the same in both cylinders during rapid traverse movement of the table during which time it may be said that the backlash eliminator is off.

The gear 76' has hubs 79 projecting from opposite ends thereof which are anti-frictionally journaled in the nut box 80. The gear has a spline bore into which fits the spline shaft 81 which is journaled at 82 in the bed of the machine and has an integral collar 83 which serves to position the shaft in an axial direction. This shaft has a keyed end 84 which is received in the splined bore 85 of the hub 86 of a bevel gear 87, which gear is fixed for rotation in the gear box 88. When the gear box is removed from the end of the machine it is automatically disconnected from the end of shaft 84 and thereby breaks the driving connection to the table lead screw. This makes it possible to construct and assemble the mechanism in the gear box 88 independent of the machine and then assemble it with the bed of the machine and automatically establish a driving connection with the table lead screw, the collar 83 holding the shaft 84 in the proper position during the assembly of the hub 85 thereon. The gear 87 constitutes the final drive gear in the feed box for moving the table at various feed rates or at a rapid traverse rate and is actuated to effect these various rates by the following mechanism, reference now being had more particularly to Figures 2 and 3.

A prime mover 89 is mounted on a bracket 90 carried by the gear box 88 and is connected through an Oldham coupling 91 to shafts 92, anti-frictionally journaled in the feed box and carrying a pinion 93. This pinion intermeshes with a spur gear 94 which is secured to a sleeve 95 which is anti-frictionally journaled as by the bearings 96 for free rotation relative to a supporting shaft 97. The sleeve 95 has a bevel gear 98 fixed to one end thereof which is connected by an intermediate bevel gear 99 to a bevel gear 100 which is mounted co-axially of bevel gear 98 but which will rotate in an opposite direction with respect thereto. The bevel gear 100 is also supported on anti-friction bearings 101 for free rotation with respect to the supporting shaft 97. It will now be seen that the gears 98 and 100 are rotated in opposite directions continuously during actuation of the prime mover and means have been provided for alternately connecting these gears for rotation of shaft 97 and which thereby constitutes a reversing mechanism. The bevel gears 98 and 100 have multiple disc friction clutches 101 and 102 associated therewith and an intermediate shiftable member 103 serves to alternately couple these gears through the friction clutches to the shaft 97.

The shaft 97 has a gear 104 keyed at one end thereof, adjacent to gear 94, which intermeshes with a spur gear 105, more particularly shown in Figure 3, and which is directly over gear 104. The gear 105 is mounted for free rotation and supported by anti-friction bearings 106 on a supporting shaft 107. This gear has an extended hob 108 in which is enclosed a multiple disc friction clutch 109 by which it may be connected by the shiftable member 110 to drive shaft 107. The direction of rotation of this drive will depend upon the position of the reversing clutch control member 103. Furthermore, since this drive is direct from the prime mover the rate of rotation will be at a relatively fast or quick traverse rate.

The shaft 97 has a pinion 111 keyed thereto at the end opposite to the take-off of the rapid traverse drive and this pinion serves to actuate the feed transmission. As shown in Figure 2 this pinion meshes with a large spur gear 112 which is keyed to a sleeve 113 mounted for free rotation in anti-friction bearings 114. The sleeve carries a pinion 115 which meshes with gear 116 of the couplet 117, which in turn is keyed on a shaft 118. The other gear 119 of the couplet meshes with a gear 120 keyed to the shaft 121 which has one end journaled at 122 in the bore of the sleeve 113 and the other end 123 journaled in the hub of spur gear 124. The shaft 121 also has a sleeve 125 keyed thereto on which is formed a pinion 126 which meshes with a large spur gear 127 directly over it as shown in Figure 3, this spur gear having a pinion 128 integral therewith, this gear and pinion being mounted for free rotation relative to a supporting shaft 129'. The pinion 128 meshes with a large spur gear 129 directly beneath it and is mounted for free rotation relative to the shaft 123. The gear 129 has an extended hub 130 upon which, as shown in Figure 2, is mounted a collar 131 having a keyed connection 132 with said hub and thereby rotatable therewith. It will also be noted that shaft 121 has a reduced portion 133 upon which is keyed a sleeve 134, having in turn keyed to its periphery a pinion 135. In the arrangement of the parts as shown, the gear 135 meshes with a spur gear 136 mounted on the overhead shaft 129'. This shaft has keyed on the end of it an internally and externally splined sleeve 137 for receiving a collar 138 and the gear 136.

It will be noted that the pinion 126, Figure 2, is keyed to the shaft 123 whereby the end portion 133 of the shaft is rotated at the same rate as pinion 126 and therefore the gear 135 will drive the gear 136 and shaft 129' independently of the reduction effected through the train of gears 126, 127, 128 and 129. The gears 135 and 136 are removable so that they may be interchanged or other pairs of gears substituted therefor whereby a first series of feed rates may be obtained. In addition, the collars 131 and 138 are also removable and the gears 135 and 136 may be substituted in their place for effecting a second series of feed rates, the collars in this case being then mounted in the position now taken by the gears 135 and 136. When these changes are made the cover plate 139 is removed.

The shaft 129' extends into the interior of the feed box and is provided with a pinion 140 for driving the large spur gear 141 mounted for free rotation with respect to shaft 107. It will be noted that the gear 141 is co-axial of the gear 105 and the shiftable member 110 constitutes a feed rapid traverse selector for alternately connecting these gears to the shaft. The shaft 107 drives, through the bevel gear 142, the bevel gear 87 which is the final actuator for the table lead screw.

The constructional details of the feed-rapid traverse selector is more particularly shown in Figure 23 in which it will be seen that the slideable member 110 is splined to a sleeve 143, which in turn is connected by a key 144 to the shaft 107 for rotation therewith. The keys 145 are fixed with the member 110 for movement therewith and each has a bevel end 146 which operates on a bell crank 147 for applying frictional pressure to the plates 148 of the multiple disc friction clutch, indicated generally by the reference numeral 109, whereby the member 108 will drive the shaft 147 at a rapid traverse rate.

The opposite end 149 of keys 145 is also beveled for engaging a bell crank 150 which applies pressure to the plates 151 of a second multiple disc friction clutch to initiate rotation of gear 141. This friction clutch is so adjusted as to initiate rotation and is utilized solely for that purpose so as to prevent shock when the drive is started, there being clutch teeth 152 formed on one face of the member 110 for interengagement with similarly formed clutch teeth 153 on the hub of gear 141 for positively driving the same. The parts are so positioned that the friction clutch will engage before the positively driving clutch teeth interengage, whereby the parts are slowly moving at the time of the interengagement of the positively driving clutch teeth.

The member 110 may be moved to a central position with respect to the feed and rapid traverse clutches whereby both the feed transmission and the rapid traverse transmission are disconnected from the table which serves to stop the table movement. Thus the member 110 is not only a feed-rapid traverse selector but also a means for stopping the table.

When the clutch 110 is in a neutral position the table may be rotated manually through the following means. A gear 154 is mounted for free rotation on the end of shaft 107 and normally connected thereto when the machine is stopped by a multiple disc friction clutch 155 which is operated by a shifter spool 156. The gear 154 meshes with a pinion 157 keyed to the end of a rotatable shaft 158 which has clutch teeth 159 formed on the outer end thereof. This end of the shaft is bored to receive a plunger 160 which carries a manually operable handle 161 having a hub 162 on which is formed clutch teeth 153 for engagement upon axial movement with the clutch teeth 159. Simultaneous with this movement of the plunger a second clutch member 164 which is connected by a cross pin 165 to the plunger 160 is moved axially to separate the clutch teeth 166 from the clutch teeth formed on the member 167, which member is fixed as by screws 168 to the bed of the machine. A spring 169 is interposed between the end of the plunger 160 and the bottom of the bore in the shaft 158 for normally urging the plunger outwardly whereby the manually operable handle is disconnected from shaft 158 and the shaft is in turn connected by the clutch member 164 to a fixed part of the machine so that it cannot rotate. The object of this is that when the machine is being operated by power the gear 154 is held against rotation so that upon stoppage of the table and the throwing of shifter spool 156 the shaft 107 may be braked through the friction clutch 155 and the temporarily fixed gear 154. Upon axial movement of the plunger 160, however, the gear 154 is no longer locked and may now in turn rotate through the friction clutch, the shaft 107, and through the interconnecting bevel gear, the shaft 84. The friction clutch 155 thus serves as a brake to stop the machine and also serves as a driving means during manual operation of the table. The clutch 156, the feed rapid traverse selector 110 and the direction determining member 103 are adapted to be shifted by an intermediate power means under manual control of the operator or under automatic control from the movement of the work table.

The power operable means for shifting the various control clutches includes a first power rotatable cam 170, Figure 3, which determines feed, rapid traverse or stop of the table and a second rotatable cam 171, Figure 2, which determines the direction of movement of the table. In other words, the first cam has three positions and power rotation to these three positions is controlled by three solenoids 172, 173 and 174 and in such a manner that energization of these solenoids in the order recited will position the control clutches to effect respectively feed, stop or rapid traverse. Another pair of solenoids 175 and 176 controls the shifting of the reversing clutch, energization of solenoid 175, positioning the parts to cause movement of the table to the left and energization of solenoid 176, causing movement of the table to the right. There are thus five solenoids, anyone of which, when energized, will cause movement of the respective cam controlled thereby to a definite position to produce a definite result.

The energization of these solenoids is controlled by a single plunger which operates on suitable switches, the plunger itself being actuated either manually or automatically. This plunger 177 is shown more particularly in Figures 11 and 16 and is movable to six different positions, which correspond to six different positions of the manual control lever 178. This lever is supported as by an integral ball portion for universal movement in the control bracket 180 and has a ball shaped end 181 which fits in a hole 182 formed in the oscillatable and axially movable lever 183. This lever has a second hole 184 formed therein for receiving the ball ended pin 185 which projects from the side of the plunger 177. The lever 183 is mounted for oscillation and axial movement upon a pin 186, also fixed in the bracket 180. From this it will be seen that if the lever 178 is moved counterclockwise, as viewed in Figure 16, that the lever 183 will be axially moved toward the left, thereby causing rotation through member 185 of trip plunger 177. Furthermore, it will be evident that if the lever 178 is moved up or down with respect to the plane of the drawing that the lever 183 will be oscillated about the pin 186 and thereby move the plunger 177 up or down in a similar manner.

The lever 178 has six positions and in its position shown in Figure 11 it will cause a feeding movement of the table to the left. The other five positions to which the lever may be moved are indicated by the dash and dot lines 187, 188, 189, 190 and 191, Figure 11, which positions correspond respectively to rapid traverse left, rapid traverse right, feed right, stop right, and stop left. This means that the plunger 177 is rotatable to two positions and axially movable to three positions, whereby a total of six positions is possible.

Hydraulic means have been provided for detenting the plunger 177 and the control lever 178 in these six different positions and consists of a valve block 192 having plungers 193, 194 and 195 reciprocably mounted therein. The plunger 177 has an axially elongated lug 196 projecting from the side thereof as shown in Figure 19 which interengages a slot 197 formed in the side of plunger 193. Plunger 177 also has an annular groove 198 in which fits a roller 199 attached to the end of a bell crank 200 mounted for oscillation on a fixed pin 201. This bell crank is connected as shown in Figure 20 by a bolt 202 to a link 203. This link carries a pair of pins 204 and 205 which project laterally from the link into notches 206 and 207 formed in the side of plungers 194 and 195 respectively.

Hydraulic pressure is supplied to the valve block from a pump 208 which is driven from the continuously rotating shaft 209 which carries the bevel gear 99 as shown in Figure 2. The shaft 209 has a gear 210 meshing with spur gear 211 mounted on shaft 212 which is journaled in a bearing 213 and connected by a coupling 214 to the end of the pump shaft 215. This pump has an intake 216 and a delivery channel 217 which is connected to the valve block and which has therein a relief valve 218 by which excess fluid may be returned to reservoir. By interdrilling in the valve block the pressure supplied through channel 217 is delivered to the annular groove 219 which surrounds valve plunger 193; to annular groove 220 which surrounds plunger 194; and to annular groove 221 which surrounds plunger 195.

The plunger 193 has a spool 222 formed intermediate of the length thereof and which is larger in diameter than the adjacent spools 223 and 224 whereby pressure entering the space 225 has a differential effect and causes movement of plunger 193. For instance, in the position of the parts shown in Figure 18 pressure is acting upon the left side of spool 222 and on the right hand end of spool 224 so that a resultant in the direction toward the right is produced which rotates the plunger 177 until the end of the plunger 193 abuts the adjustable stop 226. This stop consists of a bolt threaded in a fixed part of the bracket and a lock nut 227 whereby it may be locked in a suitable position. When the plunger 177 is rotated counterclockwise, as viewed in Figure 16, the spool 222 will move toward the left and immediately upon passing the port 228 the fluid pressure will enter between the right hand side of spool 222, and the end of spool 223, to produce a sudden resultant toward the left and thereby an immediate completion of the rotating movement until the end of spool 224 hits the end plate 229. The plunger 193 thus hydraulically detents plunger 177 in its two rotative positions and regardless of its vertical position.

In a similar manner the plunger 194 is provided with an enlarged spool 230 movable relative to pressure port 231 so that immediately upon passing the port in either direction the movement will be automatically completed. The plunger 195 is also provided with an enlarged spool 232 movable with respect to the pressure port 233 for detenting spindle 195. The limits of movement of plunger 194 and 195 are determined by the plate 229 and the cover plate 234.

The manner in which plungers 194 and 195 rotate upon vertical movement of the plunger will now be explained. In the position of the parts shown in Figure 18 the plunger is in a central position vertically and therefore the bell crank 200, shown in dash and dot lines, may be moved clockwise upon upward movement of plunger 177 or counterclockwise upon downward movement of the plunger. Assuming for the moment that the bell crank is moved counterclockwise due to upward movement of the plunger which means that the bolt 202 will move toward the left as viewed in Figure 18. This movement will tend to carry the link 203 along with the bolt but the upper end of the lever cannot move toward the left because the plunger 194 already abuts the end plate 229 preventing movement in that direction. Since the upper end of the lever 203 cannot move the lever will tend to rotate about the pin 204 as a center and cause movement of plunger 195 toward the left. As this movement takes place an interlock pin 235 will be moved upward by the bevel side 236 of a V-shaped notch formed in plunger 195 and cause engagement of the upper end of the pin in the V-shaped notch 237 formed in plunger 194, thereby locking the plunger 194 against movement until plunger 195 has returned to the position shown in Figure 18. It will now be seen that upon upward movement of the plunger 177 from its central position shifting of plunger 195 will be caused and thereby hydraulic detenting of plunger 177 in its upper or rapid traverse position and regardless of its rotative position.

If the bell crank 200 is assumed to move downward from the position shown it will tend to cause movement of the bolt 202 in a counterclockwise direction about the pin 201, and also tend to carry the link 203 in the same direction. But the lower end of the link is in engagement with plunger 195 which is already in its extreme right position and cannot move any further in that direction, whereby the link will be pivoted about the pin 205 as a center and cause movement of plunger 194 toward the right. This movement will tend to hold the interlock pin 235 in engagement with plunger 195, preventing movement thereof until plunger 194 has returned to its central position. It will now be seen that the plunger 177 is hydraulically detented in any one of the six positions to which it may be moved.

In addition to hydraulically detenting the plunger 177 rotatively the plunger 193 also determines the operation of the backlash eliminating means. In other words, as previously stated, pressure is admitted to cylinder 77 of the backlash eliminator when the feed movement is in one direction and it is admitted to cylinder 78 when the feed movement is in the opposite direction. If, then, the direction of movement of the table is changed, as from feed right to feed left, the pressure must be reversed on the backlash eliminator. This is accomplished in the following manner.

When the plunger 193 is in the position shown the pressure from port 228 is connected to port 238 from which it passes through interdrilling to the annular groove 239 and port 240 formed adjacent the plunger 194.

When the plunger 193 is shifted to its extreme left position the port 228 is then connected to port 241, which by interdrilling is connected to port 242 formed adjacent of the plunger 194. A cannelure 243 formed in the plunger 194 is effective when plunger 194 is in the position shown in Figure 18 to connect port 240 to port 244 and a second cannelure 245 interconnects port 242 with port 246. The ports 244 and 246 have channels 247 and 248 respectively connected thereto which lead to the backlash eliminating cylinders 77 and 78. It will be remembered that the plunger 194 is in a feed position in Figure 18 which makes it possible for the plunger 193 to alternately connect pressure to the backlash eliminating cylinders and therefore apply the proper directional pressure on the backlash eliminator in accordance with the direction of movement of the table. When the plunger 177 is moved upward to a stop position corresponding to downward movement of the lever 178 the plunger 194 is not moved from the position shown in Figure 18 so that the same connections apply to the backlash eliminator in the stop position of the plunger as in the feed position thereof. However, when the plunger 177 is moved downward to a rapid traverse position corresponding to upward movement of the lever 178 the plunger 194 is then shifted to the right. In this position the cannelure 243 will interconnect ports 244 and 246 with port 240 which means that if the port 240 happens to be under pressure as determined by the position of plunger 193 then equal pressure will be applied to opposite ends of the shifter rod 72 of the backlash eliminator and it will assume a more or less central position in which the backlash eliminator is rendered non-effective. If the port 240 happens to be connected to exhaust, due to the position of plunger 193, the result is the same in the sense that the same pressure exists in cylinders 77 and 78 so that the shifter member 72 will again assume a central position and the backlash eliminator will be non-effective. It will thus be seen that the effect of the backlash eliminator is automatically taken care of in accordance with the position of plunger 177.

The plunger 177 may also be moved to its several positions automatically by suitable trip dogs carried by the table acting on a plunger 249 which is operatively connected by a ball ended stud 250 to the oscillatable and axially movable member 183, the member 250 interfitting in a hole 251 formed in the member 183. Referring to Figure 16 it will be seen that the plunger 249 is on the side of pin 186 opposite to plunger 177 so that the plunger 249 will move up when the plunger 177 moves down and vice versa, but that plunger 249 will have the same directions of movement for the same results as the handle 178 so far as vertical movements are concerned, but when the lever 178 is moved counterclockwise the plunger 249 will be rotated clockwise and vice versa. This results in the hand lever 178 having directional control in that when it is moved clockwise or to the left to the position shown in Figure 16 the table will move to the left and when moved counterclockwise or to the right from the position shown the table will move toward the right.

An auxiliary plunger 252 is supported adjacent the plunger 249 which is utilized solely for automatically stopping the table regardless of the cycle in which it is moving or the rate at which it is moving and this plunger has a shoulder 253 formed thereon for engaging the end of a fixed bushing 254 and a spring 255 interposed between the lower end of the plunger and the housing for holding the plunger up as limited by the shoulder 253. The plunger has an intermediate enlarged portion 256 in the side of which is formed a slot 257 in which rides a lever 258 pivoted on a fixed pin 259. This lever has a bifurcated end in which is mounted a pawl 260 oscillatable on a pin 261. The pawl 260 has an end portion 262 adapted to engage a shoulder 263 carried by the plunger 249. The lever 258 has a depending pin 264 which engages the bottom of the groove 253 and the top of the lever is engaged by a spring pressed pin 265 carried by the plunger 252. The pin 264 acts to hold the lever 258 at a sufficient angle to permit upward movement of the plunger 249 to a rapid traverse position without interference from the pawl 260. The plunger 265 serves to transmit motion from the plunger 252 to the lever 258 upon downward movement of the plunger and the lost motion resulting from compression of spring 266 permits the pin 264 to move relative to the groove without too much friction.

The pawl 260 has a shoulder 265 which will engage the top of a fixed pin 266 as it approaches the limit of its downward movement and in such timed relation that the end 262 of the pawl will be moved off of the shoulder 263 after it has moved the plunger 249 downward a sufficient amount for the hydraulic detent to complete the movement to a stop position. This will rotate the pawl 260 in a counterclockwise direction against the urge of a spring plate 267 carried on the top of the lever. The idea of this mechanism is to permit the plunger 177 to be returned to its same position before it was depressed by the stop plunger or even to a different position, while the stop dog is still holding the stop plunger in a depressed position. In other words, the mechanism acts to depress the plunger 249 and then automatically disengage itself therefrom whereby it may be immediately moved manually without the necessity of manually moving the table to get the stop dog off of the stop plunger. For instance, on a continuous reciprocating cycle with work fixtures mounted on opposite ends of the table whereby one may be loaded while the cutter is acting upon the other, a stop dog may be positioned to stop the table with the cutter intermediate the two fixtures so as to insure that the loading operation has been completed before the cutter engages with the work carried thereby and when the table stops, the operator, if the loading has been completed, merely throws the lever 178 to the proper position whereby the cycle will continue.

Energization of the various solenoids is controlled by four double poled, double throw switches indicated generally by the reference numerals 268, 269, 270 and 271 in Figures 11 and 21. These switches are conventional commercial type limit switches having a central pivoted arm 272 and rollers 273 in the extremities of the arm for engagement by suitable cam surfaces for throwing the switch.

These switches are mounted in a separate compartment 274 located in the control bracket underneath the compartment 275 which houses the hydraulic detent mechanism. Since the hydraulic detents exhaust directly in the compartment 275 and the return oil collected by a sump pipe 276 communicating with the floor of the compartment it is necessary to prevent oil from flowing into the lower compartment. To prevent this and still make it possible to pass the control plunger into the lower compartment a bushing 277 is fixed in the floor of compartment 275 and extends upward to a height sufficient to maintain the top thereof above the normal level of oil that might accumulate in the upper compartment. The plunger 177 has an axially drilled hole in which is inserted and fastened a control rod 278. This control rod extends through the lower compartment and is journaled at the lower end in a bearing 279.

The control rod 278 has a first cam member 280 secured thereto and more particularly shown in Figure 33. This member has a cam portion 281 for operating the switch 268 upon movement from its extreme upper or stop position to its intermediate or feed position, or vice versa, but upon downward movement from the intermediate or feed position to the rapid traverse position it has no effect on the switch. This member also has a second cam portion 282 for operating switch 270 upon each rotary movement of the plunger.

The member 278 has a collar 283 secured thereto for operating switch 269 upon movement from its extreme lower position to its intermediate position, or vice versa, but upon movement from its intermediate position to its extreme upper or stop position it has no effect on the switch.

As shown in Figure 31, the member 278 has a gear segment 284 pinned thereto which interengages with a mutilated gear 285 secured to shaft 286 upon which is pinned a switch operating member 287. This member has two lobes 288 and 289 which control switch 271. The lobe 288 acts on the switch imediately upon rotation of the plunger 278 to throw the switch, and since the gear connection multiplies the movement of the member 287 relative to the movement of member 278 the second lobe 289 will have sufficient movement to reset the switch whereby the switch is thrown twice for each rotary movement of member 278 regardless of the direction of this movement.

The manner of electrically connecting these switches to the solenoids is more particularly shown in Figure 21 and the operation of the circuit will be explained from this figure. It will be noted that throughout the description of the trip plunger reference has been made to the fact that the trip plunger is shown in a position to yield a feeding movement of the table to the left. The various control switches shown in Figure 21 are also positioned so as to yield this movement. The main switch 290 serves to connect power to the entire trip control circuit. Starting with pole 291 of switch 290 the current flows to the inner connection 292 where it divides into branches 293 and 294. Branch 293 is connected to pole 294 of switch 270 and since the switch member 295 thereof is closed the current continues through line 296 and solenoid 175 back to the other main switch terminal 297. As previously stated, energization of solenoid 175 will shift the direction determining clutch to yield movement of the table to the left. It will be noted that the other branches connected to line 293 are open at this time.

Current flowing through line 294 is connected by an interlock switch 298 associated with the starting lever 299 which is connected to poles 300 and 301 of the switch levers 302 and 303 respectively of switch 268. The switch lever 302, being closed, causes the current to pass through solenoid 173 and back to pole 297. The solenoid 173 is the stop solenoid and is controlled oppositely to the manner of controlling the feed and rapid traverse solenoids in that the stop solenoid is always energized except when the machine is to be stopped when it is de-energized, whereas the feed and rapid traverse solenoids are normally de-energized and are only energized when their particular functions are to be performed. The idea of this arrangement is that should any break or failure occur in the electrical circuit the stop solenoid will be de-energized, whereby a spring will come into action to immediately stop the machine.

Since the switch member 303 is also closed the current flows through line 304 to pole 305 of switch 269, and since the switch member 306 thereof is closed, the current continues and energizes the feed solenoid whereby the feed-rapid traverse clutch is shifted to cause movement of the table at a feed rate.

It will thus be seen that in the feed left position of the trip plunger that the stop solenoid, the feed solenoid and solenoid 175 are all energized.

In a reciprocating cycle it is usually desirable after completing a feed movement to reverse the table and to return it at a rapid traverse rate, or in other words, to simultaneously effect a change in direction and rate. This is automatically effected in the following manner. The trip plunger 249, as shown in Figure 35, has a lug 307 which projects toward the table when the plunger is in the rotary position shown, and this lug is adapted to be engaged by a dog 308 which has a bevel face 309 for contacting the underside of the lug 307 for lifting the same. This lifting movement of plunger 249 will, however, be a downward movement of plunger 177 due to the manner of interconnecting these members as previously explained. Downward movement of member 177 will yield, of course, a rapid traverse movement.

It is desirable, however, that the direction be changed also and a second dog 310 is positioned on the table adjacent dog 308 and this dog has an encircling arm for engaging a wing 312 which projects from the side of plunger 249, as more particularly shown in Figure 35. These two dogs are positioned to contact the plunger almost simultaneously so that both movements will be carried out substantially together but in the following specific manner. The plunger is moved downward a sufficient amount to move the hydraulic detent mechanism to a central position which would correspond to the loading operation of a load and fire mechanism. During this movement the plunger is rotated, and as soon as the rotation starts the lug 288, shown in Figure 31, throws switch 271. This produces the first effect on the electrical circuit which is to close the switch member 313 of switch 271. This switch may be termed a by-pass switch in that it closes a parallel circuit around the switch member 306 of switch 269.

The other switch member 314 of switch 271 is simultaneously opened with the closing of switch 313 which thereby breaks the circuit from line 293 to the rapid traverse solenoid 174 at two points because the switch member 315 of switch 269 is open at this time. This effect conditions the circuit for operating switch 269 without breaking the feed connection.

Since the plunger is being rotated by dog 311 the lug 307 on the plunger is gradually being rotated out of the path of dog 308, and when the plunger has completed its rotary movement the lug 307 will be completely out of the path of dog 308. It is, therefore, not only necessary to complete the axial movement of the plunger before the rotary movement is completed, but also to complete both movements as close together as is possible. As a matter of fact the vertical movement is completed first which operates through the detent mechanism to throw switch 269. It will be noted that in the half-way position of the switch members 306 and 315 that both circuits are momentarily broken whereby the switch member 313 of switch 271 electrically maintains the feed circuit and insures that nothing happens until the switch member 315 has been closed. It will be noted, however, that even after the switch member 315 has been closed that the switch member 314 is still open. From this it will be seen that the switch 269 has in effect been prepositioned without in any way disturbing the continuation of the present cycle of the machine.

The last thing that happens is that the plunger completes its rotary movement which throws switch 270 to change the direction and simultaneously resets switch 271 in the position shown in Figure 21 which thereby completes the circuit through the switch member 315 of switch 269 and thus operation of the rapid traverse solenoid 174. It will be noted that throughout these changes that no effect was produced on switch 268, the control cam portion 281 therefore merely moving downward away from the switch and leaving it set in its previous position. This will result in movement of the table toward the right at a rapid traverse rate and will shift the manual control lever 191 to the dotted line position 190 in Figure 11.

Before the next feeding operation takes place it may be desirable to place a stop dog, such as 316, on the table, as shown in Figure 1, which will depress the stop plunger 252 to insure that the work has been properly loaded before the next feeding operation starts. Depression of this stop plunger will, through the interconnecting mechanism previously described, cause upward movement of control rod 278 which will simultaneously operate switches 268 and 269, the switch parts in 269 assuming the position in which they are shown in Figure 21 and the switch members 302 and 303 of switch 268 being opened. In spite of the fact that the switch member 306 is closed, still the switch member 303 is opened and since in serial relationship therewith the feed solenoid will be de-energized. Also, solenoid 173 will be de-energized due to opening of switch member 302, but de-energization of this solenoid will cause operation of the control cams in a manner to stop the machine. From this description of the control circuit it is believed that its manner of operation will be clearly understood and that it is merely a matter of selecting the proper control dogs and suitably positioning them on the table to produce any conventional cycle of operation desired.

The switch member 298, previously referred to, is under control of the spindle starting control lever 46 and is only closed when this lever is in a position to cause rotation of the tool spindle.

Attention is also invited to the fact that the plunger 249 has an additional lug 317 by which the same is axially moved by dogs during movement of the table toward the right. It is also provided with another wing 318 on the opposite side for engagement by a reversing dog when the table is moving toward the right.

A constantly rotating means has been provided to which the control cams may be selectively coupled for positioning the several clutches controlled thereby. This means may be considered as a constantly rotating branch transmission driven by the prime mover and independent of the rate and direction clutches. The bevel gear 100, Figure 2, is continuously driven by the prime mover, as previously described, and has integrally formed therewith a spur gear 319 which meshes with a large gear 320 of a couplet 321 supported for free rotation on the elongated hub of gear 112, the smaller gear 322 of this couplet driving the spur gear 323.

This gear, as shown in Figures 10 and 30, is supported for free rotation co-axially of the shaft 324 and is connected to it by an overload release clutch comprising V-shaped clutch teeth 325 formed integral with the spur gear 323 and similarly formed teeth 326 formed on the end of a sliding clutch member 327 which is splined on the end of a hollow sleeve 328, the sleeve being connected as by a set screw 329 to the shaft 324.

A stud 330 is threaded in the sleeve 328 and projects through one end thereof for supporting a spring 331, one end of which engages a washer 332 which is interposed to transmit movement to the end of an overload switch lever 333. The other end of the spring abuts a shoulder 334 integral with the sliding clutch member 327. Under normal conditions, the spring will hold the clutch 327 into engagement with the clutch teeth of gear 323 but should the load on the cams, which are rotated by shaft 324, become excessive the member 327 will be retracted and through the spring actuate the lever 323 to throw a switch that will start the machine.

The shaft 324, as shown in Figure 10, is journaled at one end in a sleeve 335 carried by a fixed part of the housing and at the other end in a sleeve 336. The intermediate portion of the shaft extends through the direction determining cam 171 which is journaled at 337 and 338 for free rotation relative to shaft 124.

A spur gear 339 is keyed to shaft 324 for continuous rotation therewith and intermeshes with a second spur gear 340 mounted for free rotation relative to a shaft 341 upon which is keyed the rate determining cam 170 which is rotatable with the shaft and is also axially movable relative to the shaft.

The gears 339 and 340 constitute continuous rotating termini of the constantly driven branch transmission to which the direction and rate determining cams may be selectively interconnected for intermittent rotation thereby. The type of connecting means utilized in each case is the same and comprises a roller cam clutch, the details of which are more particularly shown in Figure 8.

Each of the gears 339 and 340 has an annular flange 342 projecting from the side thereof for encircling three rollers equally spaced about the periphery of an equilateral triangular shaped cam portion 344 which, as shown in Figure 10, is an integral part of shaft 341. The sleeve 345 has a slightly reduced portion 346 which interiorly telescopes the flange 342 of gear 340 and has three equally spaced slots 347 cut therein, as more particularly shown in Figure 4, in which are inserted the rollers 343. The portion 346 also has three additional equally spaced rectangular shaped openings 348, and intermediate of the slots, and in each opening there is pivoted a friction shoe 349 which is urged radially outward by springs 350 carried by the portion 346.

The shaft 341 also carries a fixed pin 351, Figure 7, which extends into an opening 352 formed in the sleeve 345 and a spring 353 is interposed between one side of the pin and the sleeve 345 which acts when the parts are free to cause rotation of the sleeve 345 in a counterclockwise direction, as viewed in Figure 7, relative to the shaft 341. The sleeve 345 also has three radially extending lugs 354, 355 and 356 which lie in different planes perpendicular to the axes of the shaft as more particularly shown in Figure 10.

Three pawls, 357, 358 and 359, lie in the respective planes of these lugs for engaging the same and stopping rotation of the cam at desirable points in its movement. The method of operation is as follows.

In Figure 7 the sleeve 345 is held against rotation by the pawl 357 and if this pawl is now assumed to be lifted or moved out of the path of lug 354 the spring 353 would cause counterclockwise rotation of the sleeve 345 and thereby movement of the portion 343 relative to the cam 344, tending to shift the rollers in a counterclockwise direction as viewed in Figure 8 into wedging engagement between the flange 342 and the cam 344. This movement will be assisted by the frictional engagement of the shoes 349 with the inside of the flange 342 because the flange and gear 340 are continuously rotating, as viewed in this figure, in a counterclockwise direction. This wedging action will cause the cam 344, shaft 341 and shifter cam 170 to rotate therewith. This rotation will continue until one of the pawls 357, 358 or 359 is moved into the path of its respective co-acting lug carried by the sleeve 345 whereby the sleeve will immediately stop rotating. Stoppage of the sleeve means that the rollers 343 will immediately be held stationary while the outside sleeve 342 will continue in a counterclockwise direction and the cam portion 344 will continue in a counterclockwise direction momentarily due to its own inertia and the inertia of the parts connected therewith, whereby the roller will no longer be in a wedging position and rotation of the cam 170 will immediately stop. Since the pin 351 shown in Figure 7 has only a small amount of clearance between itself and the opening in sleeve 345, any overrun of shaft 341 beyond the predetermined amount necessary to loosen the rollers 343 will be immediately checked.

In order to additionally insure that the cam member 170 is stopped rotatively in the upper position and held in such position against intermittent movement a detent mechanism has been provided comprising a disc 360 keyed or otherwise secured to the end of shaft 341 and a pivoted detent member 361 shown more particularly in Figure 29. The disc 360 has a pair of L-shaped notches 361 cut in the periphery thereof for successive engagement by the detent. It will be noted that there are only two notches for the reason that the cam 170 has only two rotative positions which are 180° apart, one of which yields rapid traverse and stop and the other of which yields feed. The rapid traverse-stop position of the cam is distinguished, however, by providing for axial movement of the cam whereby the cam has one axial position for rapid traverse and a second axial position for stop.

The detent 362 is continuously urged into engagement with the periphery of the member 360 by spring 363 and as the shaft 341 approaches a given position and the detent snaps home the bevel face 364 on the detent will insure completion of the movement since the shaft 341 rotates in a counterclockwise direction in this view and the friction between the point 365 of the end of the lever and the bottom of the notch is sufficient when the power means has been disconnected to prevent any inadvertent movement.

The same form of roller cam clutch means is utilized for connecting drive gear 339 with the direction determining cam 171 but in this case the sleeve 345' is provided with only two lugs 366 and 367 since it is only necessary to rotatively position the cam 171 in two positions.

Similar means have also been provided for the cam 171 which are shown more particularly in Figure 28 and consist of parts similar to the previous detent mechanism including a wheel 368 having L-shaped notches 369 and a spring pressed detent lever 370. The action is the same as that previously described.

The cam 171 has a groove 371 which is shown in expanded view in Figure 34. A follower 372 attached to the end of lever 373 rides in this groove and when it occupies a position corresponding to the dash and dot line 374 the direction determining clutch is shifted to yield a leftward movement of the table. The cam is stopped in this position by the following mechanism. The solenoids 175 and 176 have plungers 375 and 376 respectively which are connected as by a ball and slot connection 377 to levers 378 and 379 respectively. These levers are both secured to a shaft 380 and the lever 378 has an arm 381 which operates through a ball and slot connection 382, a lever 383 secured for rotation of shaft 384.

The solenoids 175 and 176 are respectively push and pull solenoids in the sense that when the solenoid 175 is energized the plunger 375 moves upward, which simultaneously rotates the shaft 380, as viewed in Figure 25, in a clockwise direction, and since the lever 379 is also secured to shaft 380 it will be moved upward also. Upon energization of solenoid 176 the plunger 376, and thereby the lever 379, will be pulled downward and the shaft 380 will be rotated in a counterclockwise direction. This will also cause downward movement of lever 378 and plunger 375. It will thus be seen that alternate energization of these solenoids will cause alternate clockwise and counterclockwise movements of shaft 384.

This shaft has a pair of pawls 385 and 386 integrally connected therewith, as shown in Figure 26, and the position of the parts is such that when the solenoid plungers are up the pawl 385 is moved inward into the path of lug 367 which will stop the cam 171 in the position shown in Figure 2, causing the clutch 103 to interconnect shaft 97 with bevel gear 98 and thereby movement of the table to the left.

Downward movement of the solenoid plungers will withdraw pawl 385 from the path of lug 367 and move the pawl 386 inward into the path of lug 366 whereby the cam will rotate through an angle of 180° to shift the clutch 103 to its other extreme position and thereby change the direction of movement of the table.

The pawls 357, 358 and 359, shown in Figures 5, 6 and 7 are connected to the various solenoids in the following manner. The pawl 358 is secured as by a pin connection to shaft 387 which extends parallel to the cam 170 as shown in Figure 4 and has secured, as by a pin connection, a lever 388 which has a ball and slot connection 389 to plunger 390 reciprocably mounted in the feed solenoid 172. A spring 391 is mounted to act in a direction to produce a constant urge that will tend to withdraw the pawl 358 from the path of lug 355 so that this pawl is only affected when the solenoid is energized.

The pawl 359 is integral with its operating lever 391 and these parts are mounted for free rotation relative to shaft 387. The end of lever 391' has a ball and slot connection 389 with plunger 392 reciprocably mounted in the rapid traverse solenoid 174. Another spring 391 is connected to pawl 359, tending to hold the same in an operative position.

The pawl 357 is integral with its operating lever 393 which has a ball and slot connection 389 with its operating plunger 394 reciprocably mounted in the stop solenoid 173. A spring 391 operates in a direction different than the other springs in that it tends to move the pawl 357 into an effective position, which as previously explained, insures stoppage of the machine upon any failure of the electrical circuit.

The lever 393 has a pin 395 projecting from the side thereof into engagement with the bifurcated end 396 of a bell crank 397, rotatable on a fixed pin 398. This bell crank has a ball and slot connection 399 with a reciprocable plunger 400, which, as shown in Figure 9, has a cam follower 401 journaled on the end thereof and engaging cam groove 402 and cam 170.

The plunger 400 also has a ball and socket connection 403 with a lever 404 which is pivoted intermediate of its length on a fixed pin 405. The other end of this lever has a ball and socket connection 406 with a second plunger 407 having a rotatable cam follower 408 in the end thereof adapted to interengage the cam groove 409 formed in cam 170.

The parallel plungers 400 and 407 constitute the means, in conjunction with the cam grooves 402 and 409 for shifting the cam 170 axially. In other words, when the stop solenoid became de-energized and the spring 391 moved the pawl 357 into the path of lug 354 it simultaneously through the pin 395, bell crank 397, moved plunger 400 forward into engagement with cam groove 402 and approximately at the point in the cam groove intersected by the dash and dot line 410, Figure 33. The cam, as viewed in this figure, is moving in the direction of arrow 411, which means that as the roller 402 came into engagement with the curved wall 412 of the cam path the cam was bodily shifted in the direction of arrow 413.

If, now, the stop solenoid is assumed to be energized and the pawl 357 withdrawn from the path of lug 354 the plunger 400 would immediately be withdrawn from cam groove 402 and plunger 407 simultaneously moved forward to move the roller 408 into the cam groove 409 approximately at the point intersected by the line 414. At the same time that the pawl 357 is withdrawn the cam 170 will continue to rotate in the direction of the arrow 411 and the roller 408 will engage the curved wall 415 of cam groove 409, and since the roller 408 is bodily fixed the cam 170 will be shifted in a direction opposite to arrow 413. It will thus be seen that each time the stop solenoid is energized, the cam 170 is shifted axially and the relative position of the pawls 357, 358 and 359 with respect to their co-acting lugs is such that upon withdrawal of either pawl 358 or 359 the cam will make 180° of revolution before lug 354 will engage pawl 357.

A third cam groove 416 is formed in the cam 170 intermediate the other cam grooves for receiving the roller 417, Figure 27, fixed to the end of lever 418 pivotally mounted on a fixed pin 419. This lever has a crank 420 in which is formed a bore 421 for receiving a spring 422 which surrounds a rod 423 attached at one end as by a bifurcated connection 424 to the shifter 425 for the feed rapid traverse clutch 110. The shifter is also mounted for free rotation relative to the pin 419. The rod 423 extends through the closed end 426 of the bore 421 and has a couple of lock nuts 427 threaded on the projecting end thereof. This mechanism constitutes a yieldable joint in the feed rapid traverse shifter and it will be noted it is due to such construction that upon movement of the roller 417 about the fixed end 419 in a counterclockwise direction that the shifter 425 will be moved positively to engage the rapid traverse friction clutch but upon movement of the roller 417 in a clockwise direction the shifter 425 will be impositively moved due to compression of spring 422 in case the teeth 152 of member 110 have not properly aligned themselves for interengagement with teeth 153 carried by the feed drive gear 141. In other words, should there be a momentary delay in interengagement with these teeth the clutch shifting means shown in Figure 27 will yield sufficiently so that the roller 417 can still follow the cam groove without damage to the parts.

It will be noted from Figure 3 that the roller 417 is 90° out of phase with the roller 401, which means that when the cam stops with the roller 402 on the line 414, Figure 33, that the roller 417 will be at a position in its cam groove represented by the line 428 which will correspond to the rapid traverse position. If the cam should stop with the roller 402 on the line 410 the roller 417 will be in a position in its cam groove intersected by line 429 which will correspond to the feed position. It will be noted, however, that when the cam 170 is bodily shifted axially in the direction of arrow 413 that the roller 417, which is then in a position corresponding to line 428, will be shifted toward the left in this figure and just a sufficient amount to move the clutch member 110 to an intermediate position whereby both the rapid traverse and the feed clutches are disengaged and no power is being transmitted to the table.

The cam 170 has an additional function and that is to apply a braking means whenever the cam is moved to a stop position. As previously explained, the clutch 156 in Figure 3 serves to interconnect the drive shaft 107 with the gear 154 and this gear is normally held against rotation whereby, upon engagement of the clutch 156, the gear 154 serves as a braking means for the shaft 107. The engagement and disengagement of this clutch is controlled automatically by the cam 170 through the following means. A shifter lever 429 is pivoted at 430 and has one end connected to the clutch 156 and the other end connected to a link 431 which serves as a connecting means between the lever 429 and a cam operated lever 432. The lever 432 is pivoted on a fixed pin 433 and has a cam roller 434 journaled at its opposite end for engagement with the cam groove 409.

The lever 432 is so positioned that the roller 434 is 90° out of phase with the plunger 407, which, as shown in Figure 9, has a roller 408 selectively movable into the groove. Upon comparison with Figure 33 it will be seen that the roller 434 will be positioned on the line 428 when the roller 402 has axially shifted the cam 170 to the dash and dot position shown in Figure 33, whereby the lever 432 will be shifted in such a direction as to effect an engagement of the clutch 156, which, in turn, will act as a braking means to immediately stop the movement of the table. In other words, any time that the cam 170 is axially shifted to stop the table it will simultaneously apply the braking means. This conditions the mechanism for manual rotation of the table when the power is disconnected therefrom and at the same time operates to disengage the gear 154 from the drive shaft 107 during power operation of the table so that inadvertent engagement of the manual control lever 161 with the shaft 158 will be ineffective and prevent damage to the mechanism or injury to the operator.

The entire electrical equipment of the machine is connected or disconnected relative to an outside source of power by a pair of push buttons 435 supported on the front of the machine in a suitable housing 437 and an electrical conduit 438 extends therefrom to the end of the machine for carrying the wires by which the push buttons are connected to the main switching mechanism. This cable also carries the wires from the control bracket on the front of the machine to the feed solenoids and constitutes means exterior of the bed of the machine for interconnecting the control switches in the control bracket to the control mechanism mounted in the transmission box on the end of the machine.

These push buttons are more particularly shown in the electrical diagram, Figure 21. A depression of the starting button 436 closes the circuit from the main line 438 through the electrically operated switch closing mechanism 439, conduit 440, contacts 441 and 442 of the push button, the latter contact 442 being connected with contact 443 due to the push button 437 being in a normally closed position. Contact 443 is connected through conduit 444, interlock switch 445, and conduit 446 to the main line 447. Energization of the unit 439 will close the switch of the three-phase system comprising the stationary contacts 448, 449 and 450, which are simultaneously connected with the movable contacts 451, 452 and 453 respectively. This will complete the circuit to the table operating member 454, the spindle operating motor 455 and the coolant pump operating motor 456. Simultaneously operable with the closing of these contacts is a second switch member 457 which interconnects contacts 458 and 459 so that the circuit through the switch operating device 439 is now completed through the line 460 which terminates in the contact 452 of push button 437 so that the push button 436 may now be released without stopping the motors. The device 439 will thus be energized to hold the switch closed during the operation of the machine, and when it is desired to stop the machine the operator merely depresses the push button 437 which will open the circuit through the device 439, which will automatically cause the switch contacts to separate.

Attention is invited to the fact that the switch 290 is so connected to the supply lines as to be controlled by the switch contacts 452 and 453 so that whenever the operator stops the machine he will automatically disconnect the current from the solenoids and thus prevent a waste of current.

The switch 445 is mounted in the switch box 461 shown more particularly in Figure 12 and supported on the side of the transmission box, as more particularly shown in Figure 1. This switch is normally closed but is adapted to be opened by a lever 462 which is interconnected for automatic operation by the lever 333, previously described in connection with Figure 30. In other words, when the movable clutch member 327 in that figure is shifted axially it causes rotation of lever 333 and thereby of arm 463, which, as shown in Figure 12, carries an adjustable block 464 on the end thereof for interengagement with a roller 465 carried in the end of a pivoted arm 466. The block 464, as shown in Figure 32, has a wide upper face 467 upon which the roller 465 rides so that upon upward movement of the block 464, due to upward movement of the lever 463, it will cause upward movement of the arm 466, and by means of a pin 468 acting on the face 469 of lever 462, move the same outward against the tension of spring 470 to disconnect the switch and, upon completion of this movement, the pin 468 will drop into a notch 471 formed in the lever 462 to hold the lever and thereby the switch in a disconnected position. This will break the circuit through the line 444 and cause deenergization of the switch operating device 439. Re-engagement can be manually effected by the operator rotating the lever 462 sufficient to disengage the pin 468 from the notch and permit the clutch 327 to re-engage itself if the condition which caused disengagement has been removed.

Means have also been provided for preventing operation of the table at a feed rate when the spindle is stopped and the switch 298 shown in Figure 21 is mounted in the switch bracket 472, Figure 14, and has a second switch member 473 associated therewith and so positioned that the switch 473 is open when the switch 298 is closed, or vice versa. These two switches are operable by an arm 474 carrying a pair of rollers 475 in opposite ends thereof for engagement with a switch operating arm 476 connected with the spindle clutch control lever 46. In other words, when the lever 46 is thrown to engage the spindle clutch shown in Figure 22, the switch 298 will be closed to permit operation of the feed solenoid so that the table may be moved at a feed rate, but should the switch lever be in a stop position the switch 298 will be open and the switch 473 will be closed. Should the spindle control lever be thrown to a stop position during the feeding movement the opening of switch 298 will break the circuit 299 whereby the stop solenoid will be de-energized, causing engagement of the pawl, and the feed solenoid 172 will be simultaneously deenergized, permitting disengagement of its pawl so that the control cam 170 will rotate to a stop position. The spindle interlock switch thus acts to automatically stop the feeding movement when the spindle control lever is thrown to a stop position.

If the spindle control lever is in a stop position and the solenoids 172, 173 and 174 are de-energized, which means that the switches 302 and 303 are open, and attempt is made to move the table at a feeding rate by closing these switches, the fact that the switch 298 is open would prevent the attainment of this result. The table may, however, be moved at a rapid traverse rate due to the fact that the switch 473 is closed, because it is possible to energize the rapid traverse and stop solenoids but impossible to energize the feed solenoid. This would be accomplished by throwing the switches 306 and 315 to the opposite position shown in Figure 21 whereby the current from switch 290 would flow through line 293, switches 314 and 315 and then in parallel, first through the rapid traverse solenoid 174 to switch 290 and secondly through switch 473, line 299, switch 302, stop solenoid 173 and then to switch 290 whereby the stop pawl will be withdrawn and the rapid traverse pawl moved to an operating position. The current flowing in line 299 will, however, be stopped from flowing to the feed solenoid due to the opening of switch 306.

The spindle stop interlock switch thus acts to stop the feeding movement at any time that the spindle clutch is dis-engaged and also acts when the spindle clutch is standing in a dis-engaged position to prevent movement of the table at a feed rate, but will permit movement of the table at a rapid traverse rate.

There has thus been provided an improved milling machine structure in which the transmission and control mechanism are on the exterior of the bed of the machine so that the interior of the bed may be utilized for the reception of chips and coolant without interference from transmission or control mechanism parts, and in which the transmission is built and assembled as a unit independent of the machine and likewise the control unit; and the one interconnected for the control of the other through means mounted exteriorly on the walls of the bed, the control unit being of novel construction which facilitates fast and accurate shifting of the parts whereby accurate tripping may be obtained.

What I claim is:—

1. In a milling machine the combination of a bed having side walls, one end wall integral with the side walls, work table supporting guideways formed parallel to and supported by the side walls, a drive shaft for the table extending parallel to the side walls and intermediate said guideways, said shaft projecting through the open end of said bed, a self-contained transmission box supported by the bed in a position to close the open end thereof, and means carried by the transmission box for automatic interconnection with the end of said shaft upon assembly of the transmission box with the bed, said transmission box having a prime mover supported at one end thereof for power actuation of transmission, and a manually operable control lever supported at the other end for manual operation of said transmission.

2. In a milling machine having a tool spindle and work table, the combination of mechanism for effecting relative movement therebetween including a plurality of shiftable parts for determining different rates and different directions of said movement, power operable means for shifting said parts including a pair of continuously rotatable elements, and means to selectively connect said power operable means with said elements in accordance as the change is being made in the rate, or in the direction.

3. In a milling machine having a feed transmission and a rapid traverse transmission for effecting relative movement between a work table and a tool spindle at relatively slow or feeding rates, or at a relatively fast rate, the combination of a first shiftable member for selectively coupling said transmissions for yielding their respective results, a second shiftable member for determining the direction of said movement, different power operable means for shifting said members, a pair of continuously rotatable actuators for said power operable means and control mechanism for selectively connecting the power operable means with their respective actuators in accordance as the change is being made in the rate, or in the direction.

4. In a milling machine having a tool spindle and a work table, the combination with a transmission having serially connected clutches for determining respectively the rate and direction of relative movement between the table and spindle, of a first rotatable cam means for shifting one of said clutches, a second rotatable cam means for shifting the other of said clutches, a prime mover for actuation of said transmission, a pair of actuators continuously driven by said prime mover, and means for selectively connecting said cam means with their respective actuators.

5. In a milling machine having a tool spindle and a work table, the combination with a transmission having serially connected clutches for determining respectively the rate and direction of relative movement between the table and spindle, of a first rotatable cam means for shifting one of said clutches, a second rotatable cam means for shifting the other of said clutches, a prime mover for actuation of said transmission, a pair of actuators continuously driven by said prime mover, means for selectively connecting said cam means with their respective actuators, one of said clutches having an intermediate position for stopping said relative movement, and means operable on its respective control cam for shifting said clutch to its intermediate position.

6. In a transmission for a milling machine having a work table and a tool spindle, the combination of a shiftable member having two extreme positions for yielding different effects on said transmission, and an intermediate position for yielding a third effect on said transmission, means to shift said member to its various positions including a cam, power operable means for rotating the cam, and additional means selectively effective for causing axial shifting of said cam to move said member to its intermediate position.

7. In a milling machine having a tool support and a work support, the combination of means for effecting relative movement between said supports selectively at feed or rapid traverse rates, including a shiftable clutch member, a pair of electrically energizable devices which respectively determine the feed and rapid traverse positions of said member, a switching mechanism for alternately connecting a source of electrical energy to said devices, a trip operable control member for actuating said switch mechanism, means operable upon initial movement of the plunger for establishing an electrical connection with one of said devices independent of the switching mechanism whereby continued movement of the plunger will preposition said switching mechanism, and means operable by the final movement of the plunger to render said switch mechanism effective.

8. In a milling machine having a work support and a tool support, the combination of a transmission including a feeding mechanism and a rapid traverse mechanism for alternately effecting said movement at different rates, a selector clutch for alternately connecting said mechanisms for effecting said movement, a pair of electrically energizable means alternately operable to effect the different respective positions of the clutch member, a source of electrical energy, a pair of switch members respective to the different electrically energizable means for alternately coupling the same to said source, a control part having a predetermined amount of movement, means operable during the first part of said movement to disconnect said source from one of said switches, means operable by continued movement of the control member to simultaneously actuate said pair of switches, means operable by the final movement of said member for reconnecting said source to one of said switches, and hydraulic means for effecting the final movement of said control member.

9. In a transmission and control mechanism for determining relative movement between the work support and tool support of a milling machine, the combination with a clutch member having a plurality of positions for yielding respectively a relative slow or feeding rate of relative movement; a rapid traverse rate of relative movement; or cessation of said movement; of a plurality of electrical solenoids equal in number to the number of said positions, motion transmitting connections between the respective solenoids and the clutch member for shifting the same, and means to control energization of said solenoids in accordance with the results desired.

10. In a transmission and control mechanism for a milling machine the combination with a shiftable control clutch of said transmission for determining different effects thereof upon the relative movement between a work support and a tool support, of power operable means for shifting said clutch member including a rotatable cam, motion transmitting connections between said cam and said clutch, a continuously operable source of power, means to connect said source with said cam including a rotatable member carried with the cam, means not only effective to advance said member relative to the cam but to effect said coupling, a plurality of differently spaced lugs on said member and a plurality of devices movable into the path of said lugs for effecting a relative movement between said member and said cam in a direction opposite to the first direction of movement whereby the cam may be stopped in different positions and the clutch shifted to produce different effects.

11. In a transmission and control mechanism for a milling machine the combination with a shiftable control clutch of said transmission for determining different effects thereof upon the relative movement between a work support and a tool support, of power operable means for shifting said clutch member including a rotatable cam, motion transmitting connections between said cam and said clutch, a continuously operable source of power, means to connect said source with said cam including a rotatable member carried with the cam, means not only effective to advance said member relative to the cam but to effect said coupling, a plurality of differently spaced lugs on said member, a plurality of devices movable into the path of said lugs for effecting a relative movement between said member and said cam in a direction opposite to the first direction of movement whereby the cam may be stopped in different positions and the clutch shifted to produce different effects, and electrically operable means for controlling the positioning of said parts.

12. In a milling machine having a work support, a tool support, and a transmission for effecting relative movement between the supports, the combination of a shiftable clutch member for varying the effect of said transmission, means for controlling the shifting of said member including a rotatable cam for moving said clutch to any one of three positions, one of said positions operating to stop relative movement between the supports, a source of power, roller clutch means for connecting the cam to said source of power including a sleeve having a plurality of projections thereon, a plurality of pawls movable respectively into the path of said projections, means normally causing engagement of said clutch, electrical solenoids for moving said pawls, one of said pawls serving to stop the cam in a position to neutralize said clutch, and means to continuously energize its operating solenoid during operation of the machine whereby upon failure of the electrical circuit the machine will be stopped.

13. In a milling machine having a tool support and a work support the combination of transmission means for effecting said relative movement including a reverser clutch for changing the direction of said movement, means for shifting said clutch including a rotatable cam operatively connected therewith, a source of power for rotating said cam, clutch means normally operable to connect said clutch with the source of power, a sleeve rotatable with the cam having a pair of radial projections thereon, means movable into the path of said projections for stopping rotation of the sleeve and thereby disengagement of the clutch including a shaft having a pair of diverging arms embracing the sleeve whereby upon rotation of the shaft in one direction, one of said projections will be engaged, and upon rotation of the shaft in the opposite direction the other projection will be engaged, a push solenoid and a pull solenoid operatively connected with said shaft for selective rotation thereof in opposite directions.

14. In a milling machine having a tool support, a work support and transmission means for effecting relative movement between said supports, the combination of a control mechanism for varying the effect of said transmission including a trip plunger axially movable to three different positions and rotatably movable to two different positions for yielding as many different effects of said transmission, means carried by the table for moving the plunger from one position to another, the rate of said movement depending upon the rate of movement of the table, and hydraulic means automatically effective upon completion of one-half of any of said movements to immediately complete the same.

15. In a milling machine having a tool support and a work support, the combination of a transmission for moving said work support relative to the tool support at relatively slow rates, or at a relatively fast rate, including a feed transmission and a rapid traverse transmission, means for selectively coupling either of said transmissions for movement of the work support including an oppositely shiftable member, friction clutch means engageable upon movement of the member in one direction for connecting the rapid traverse transmission for movement of the table, additional friction clutch means engageable upon predetermined movement in the opposite direction for connecting the feed transmission, and positive driving means interengageable upon completion of movement of said member in said opposite direction for positively coupling the feed transmission for movement of the table.

16. In a milling machine having a tool support and a work support, the combination of transmission for effecting relative movement between said supports including a feed transmission, a rapid traverse transmission, a clutch member oppositely shiftable for selectively connecting said transmissions for actuation of the support, said clutch having an additional position for stopping movement of the support, a driven shaft, rotation of which is controlled by said clutch, a gear supported by said shaft, means normally holding said gear against rotation, clutch means for selectively coupling said gear to the shaft, and means to effect engagement of the last-named clutch upon movement of the first-named clutch to its intermediate position whereby said last-named clutch will act as a brake.

17. In a milling machine having a tool support and a work support, the combination of transmission for effecting relative movement between said supports including a feed transmission, a rapid traverse transmission, a clutch member oppositely shiftable for selectively connecting said transmissions for actuation of the support, said clutch having an additional position for stopping movement of the support, a driven shaft, rotation of which is controlled by said clutch, a gear supported by said shaft, means normally holding said gear against rotation, clutch means for selectively coupling said gear to the shaft, means to effect engagement of the last-named clutch upon movement of the first-named clutch to its intermediate position whereby said last-named clutch will act as a brake, manually operable means for releasing said gear holding means, and manually operable means for rotating said gear to effect manual adjustment of the work support.

18. In a milling machine having a work support and a tool support the combination of transmission mechanism for effecting relative movement between the supports including a feed mechanism, a rapid traverse mechanism, an oppositely shiftable clutch member for selectively connecting said mechanism for effecting said relative movement at different rates, a shifter lever, positive means for moving said lever and a yieldable joint in said lever for permitting delayed engagement of said clutch relative to said positive shifting means.

19. In a milling machine having a tool support and a work support, the combination of transmission means for effecting relative movement between the supports including a plurality of shiftable parts for determining rate and direction of said movement, individual shifters for said parts, a continuously driven actuating means for said shifters, mechanism for selectively connecting the parts for movement by said actuating means, a trip plunger, operating dogs therefor carried by the moving support, and remote control connections between said trip plunger and said mechanism.

20. In a milling machine having a tool support and a work support, the combination of transmission means for effecting relative movement between the supports including a plurality of shiftable parts for determining rate and direction of said movement, individual shifters for said parts, a continuously driven actuating means for said shifters, mechanism for selectively connecting the parts for movement by said actuating means, and a trip operable member for automatically controlling said mechanism.

21. In a milling machine having a tool support and a work support, the combination of transmission means for effecting relative movement between the supports including a plurality of shiftable parts for determining rate and direction of said movement, individual shifters for said parts, a continuously driven actuating means for said shifters, mechanism for selectively connecting the parts for movement by said actuating means, and electrically operated means for determining the selection to be made by said mechanism.

22. In a milling machine having a tool spindle and a work support, the combination of a transmission for effecting relative movement between the parts including a plurality of shiftable elements effective to change the rate and direction of said movement, individual shifters for said elements, power operable means for actuating said shifters, a selector mechanism for determining the shifters to be coupled to said power operable means and thereby the rate and direction of said relative movement, said selector mechanism including a plurality of solenoids, a trip plunger adjacent the moving part, and individual circuits connecting the solenoids for selective control by said trip plunger.

23. In a milling machine, the combination of a bed having side walls, one end wall integral with the side walls, work table supporting guide ways formed parallel to and supported by the side walls, a nut box supported between said guide ways, a table carried by said guide ways having a lead screw passing through said nut box, a power shaft extending from the nut box to the open end of said bed, intermediate said guide ways, and a transmission box including a prime mover adapted to be attached to the open end of said bed and automatically connected upon assembly with the bed to said drive shaft.

24. In a milling machine, the combination of a hollow bed having parallel side walls and one end wall integral with the side walls, the combination of a work table supporting guide ways formed parallel and in spaced relation to the side walls, means supported between said guide ways and having an operative connection for translating a work table along said guide ways, a drive shaft for said means extending parallel to the side walls and intermediate said guide ways to the open end of said bed, a transmission box including a prime mover attached to the open end of said bed and operatively connected to said shaft, and means carried exteriorly of said bed for controlling said transmission and thereby operation of said table.

25. In a milling machine, the combination with a hollow rectangular bed, of means to support a work table adjacent the upper open end of said bed for movement parallel to the side walls thereof, a transmission box including a prime mover attached exteriorly to one end of the bed and having driving connections extending between said parallel guide ways, a control bracket attached to the exterior of said bed, and exterior operative connections between said control bracket and said transmission whereby the entire interior of said bed may be utilized for chip and coolant control.

26. In a milling machine, the combination of a bed having side walls, one end wall integral with the side walls, a work table supporting guide ways formed parallel to and supported by the side walls, a drive shaft for the table extending intermediate said guide ways and projecting through the open end of said bed, a transmission box supported by the bed in a position to close the open end thereof, means carried by the box for automatic interconnection with the end of said shaft upon assembly thereof with the bed, a prime mover carried by the box for power actuation of the transmission, and a manually operable control lever carried by the box for manual actuation of said transmission.

27. In a transmission for a milling machine having a work table and a tool spindle, the combination of a shiftable member having a plurality of different positions for causing said transmission to yield different effects, means to shift said member to its various positions including a cam, power operable means for rotating the cam to shift said member from either one of two positions to the other thereof, and additional means selectively effective for imparting a different movement to said cam and thereby movement of said shiftable member to a third position.

28. In a transmission and control mechanism for determining relative movement between the work support and tool support of a milling machine, the combination with a motion transmitting control member having a plurality of positions for causing said transmission to yield a plurality of rates, a plurality of electrical solenoids equal in number to the number of said rates, motion transmitting connections between the respective solenoids and said control member for positioning the same, and means to control energization of said solenoids in accordance with the results desired including trip operable switch means and hydraulically operable detents therefor.

WALTER D. ARCHEA.